(12) United States Patent
Nakade et al.

(10) Patent No.: US 7,752,078 B2
(45) Date of Patent: Jul. 6, 2010

(54) COMMUNICATION SERVICE METHOD AND COMMUNICATION APPARATUS THEREOF

(75) Inventors: Motoki Nakade, Tokyo (JP); Jun Tanaka, Tokyo (JP); Yoshito Shiraishi, Kanagawa (JP); Etsuo Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 11/099,087

(22) Filed: Apr. 5, 2005

(65) Prior Publication Data

US 2005/0171864 A1 Aug. 4, 2005

Related U.S. Application Data

(62) Division of application No. 09/817,597, filed on Mar. 26, 2001.

(30) Foreign Application Priority Data

Mar. 28, 2000 (JP) ............................. 2000-093034

(51) Int. Cl.
*G06Q 30/00* (2006.01)
(52) U.S. Cl. .......................................... 705/26; 705/37
(58) Field of Classification Search ................... 705/26, 705/37, 14; 434/350
See application file for complete search history.

(56) References Cited

U.S. PATENT DOCUMENTS 4,645,872 A 2/1987 Pressman et al.
5,465,288 A 11/1995 Falvey et al.
(Continued)

FOREIGN PATENT DOCUMENTS

EP 0 834 798 4/1998
(Continued)

OTHER PUBLICATIONS

HSN, These Days, TV powerhouse is even used by stars like Madonna, New York Daily News, Jun. 25, 2007, downloaded from the Internet on Jul. 28, 2008, 10 pages.*

(Continued)

*Primary Examiner*—James Zurita
(74) *Attorney, Agent, or Firm*—Frommer Lawrence & Haug LLP; William S. Frommer; Thomas F. Presson

(57) ABSTRACT

Each user terminal apparatus is connected with a service business enterprise system by a connection business enterprise system in a state that a live image can mutually be transmitted through the service business enterprise system. An user beforehand sets its live image to be appropriately utilized as an advertisement medium, and chooses selling goods to be advertised. A live image transmitted from the user terminal apparatus of the user who performed the aforesaid setting receives a superposed image, for example, by the superposing the T shirt of the user or the like with the image signal of the selling goods as the advertisement object in the service business enterprise system, and then the processed live image signal is transmitted to the user terminal apparatus of a communication companion. When the communication companion clicks this image signal, the user terminal apparatus of the communication companion is further connected with the sponsor system of the selling goods, and can receive a further explanation of the selling goods and can perform the transactions of the selling goods.

16 Claims, 14 Drawing Sheets

505

U.S. PATENT DOCUMENTS

| | | | |
|---|---|---|---|
| 5,499,327 A | | 3/1996 | Satoh |
| 5,590,197 A | | 12/1996 | Chen et al. |
| 5,592,611 A | | 1/1997 | Midgely et al. |
| 5,721,827 A | * | 2/1998 | Logan et al. ............. 709/217 |
| 5,825,408 A | | 10/1998 | Yuyama et al. |
| 5,825,884 A | | 10/1998 | Zdepski et al. |
| 5,889,852 A | * | 3/1999 | Rosecrans et al. ...... 379/355.05 |
| 5,946,664 A | | 8/1999 | Ebisawa |
| 5,959,661 A | | 9/1999 | Isono |
| 5,999,207 A | | 12/1999 | Rodriguez et al. |
| 5,999,327 A | | 12/1999 | Nagaoka |
| 6,061,659 A | | 5/2000 | Murray |
| 6,084,628 A | * | 7/2000 | Sawyer ..................... 725/34 |
| 6,115,690 A | | 9/2000 | Wong |
| 6,134,223 A | | 10/2000 | Burke et al. |
| 6,219,692 B1 | | 4/2001 | Stiles |
| 6,222,520 B1 | | 4/2001 | Gerszberg et al. |
| 6,223,209 B1 | | 4/2001 | Watson |
| 6,282,517 B1 | | 8/2001 | Wolfe et al. |
| 6,298,373 B1 | | 10/2001 | Burns et al. |
| 6,307,568 B1 | | 10/2001 | Rom |
| 6,370,580 B2 | | 4/2002 | Kriegsman |
| 6,462,740 B1 | | 10/2002 | Immel |
| 6,516,341 B2 | | 2/2003 | Shaw et al. |
| 6,535,726 B1 | | 3/2003 | Johnson |
| 6,604,086 B1 | | 8/2003 | Kolls |
| 6,631,840 B1 | | 10/2003 | Muramatsu et al. |
| 6,633,289 B1 | | 10/2003 | Lotens et al. |
| 6,792,401 B1 | | 9/2004 | Nigro et al. |
| 6,801,216 B2 | * | 10/2004 | Voticky et al. ............. 345/630 |
| 6,810,300 B1 | | 10/2004 | Woltman et al. |
| 6,816,721 B1 | | 11/2004 | Rudisill |
| 6,937,755 B2 | * | 8/2005 | Orpaz et al. ................ 382/162 |
| 7,072,856 B1 | * | 7/2006 | Nachom ..................... 705/26 |
| 2001/0051876 A1 | | 12/2001 | Seigel et al. |
| 2003/0065578 A1 | * | 4/2003 | Peyrelevade et al. .......... 705/26 |

FOREIGN PATENT DOCUMENTS

| | | |
|---|---|---|
| GB | 2 289 973 | 12/1995 |
| JP | 5-183811 | 7/1993 |
| WO | WO 93 02524 | 2/1993 |
| WO | WO 98 53611 | 11/1998 |

OTHER PUBLICATIONS

White, Ron, How Computers Work, Millennium Ed., Que Corporation, Sep. 1999.

Derfler, Frank J. et al. How Networks Work, Millennium Ed., Que Corporation, Jan. 2000.

Gralla, Preston, How the Internet Works, Millennium Ed., Que Corporation, Aug. 1999.

Borland's Paradox for Windows User's Guide, Borland International, Inc. 1994.

* cited by examiner

500

502

507

COMMUNICATION SERVICE METHOD AND COMMUNICATION APPARATUS THEREOF

This application is a division of U.S. application Ser. No. 09/817,597, filed Mar. 26, 2001, now pending, which application is incorporated by reference herein.

BACKGROUND OF THE INVENTION

1. Field of the Invention

The present invention relates to a communication service method and a communication service apparatus, that are able to supply additional services such as, for example, an advertisement propagandizing service of selling goods, an electronic commerce service and the like, in a private communication environment between specific users in a communication network capable of transmitting arbitrary data including moving images. The present invention further relates to a communication terminal apparatus and a communication system, both capable of receiving such services.

2. Description of the Related Art

Owing to the progress of various data processing technologies including communication technologies, coding technologies and the like, a portable terminal apparatus capable of processing a great deal of data such as data of a moving image.

Conventionally, for example, a Japanese Laid-Open Patent Publication No. Hei 10-164137 discloses an information processing apparatus that supplies a previously prepared other piece of information, for example advertisement information, in addition to a piece of information that an user requested when the apparatus picks up the information in an information network. Moreover, the above mentioned Patent Publication also discloses that the information to be added is image information, audio information or text information. However, although the Patent Publication discloses exchange process of information between an user terminal and a server, the Patent Publication does not disclose a technique for adding a previously prepared other piece of information into an updated piece of information in the exchange process of information between user terminals.

Then, if the use of a communication network in a broader band is used, which is expected in the near future, it is considerable that a communication terminal capable of processing a great deal of data such as data of a real time moving image (hereinafter, it is called a live image or moving image) comes into wide use.

Moreover, as one such communication terminal to become widely popular, a communication terminal in a visual telephone (TV telephone) form that has conventionally been made to be fit for practical use in conformity with various systems, namely a portable communication terminal apparatus capable of mutually transmitting live image is considerable.

By the way, almost all the communication terminal apparatus in such a visual telephone-type have been placed at a position of an apparatus only for private communication because only the transmission of live image between terminal apparatus to be aimed at.

Then, as a result, there has not been examined the connection between the communication terminal apparatus and the environment of the so-called electronic commerce such as the introduction and the advertisement of selling goods and moreover the actual dealings that are widely used in communication networks.

However, it is apparent that such a visual telephone-type communication terminal apparatus capable of transmitting moving image at real time is effective as a system related to such electronic commerce, and more effective services and systems using such communication terminal apparatus have been desired.

SUMMARY OF THE INVENTION

Therefore, an object of the present invention is to provide a communication service method and an apparatus therefore that can supply an advertisement propagandizing service of selling goods and an electronic commerce environment in a private communication environment among specific users.

Moreover, another object of the present invention is to provide a communication terminal apparatus capable of receiving an advertisement propagandizing service of selling goods and an electronic commerce environment while performing private communication with a specific user.

Moreover, a further object of the present invention is to provide a communication system capable of performing an advertisement propagandizing service of selling goods and capable, of being connected with electronic commerce while being in a private communication environment with a specific user.

Moreover, a further object of the present invention is to provide an advertisement propagandizing method capable of performing an advertisement propagandizing service of selling goods in a private communication environment among specific users.

For resolving the aforesaid problems, a communication service method according to the present invention connects a plurality of communication terminal apparatus in a state possible to transmit an audio and an image signals, and superposes an image signal concerning arbitrary selling goods to an image signal transmitted from an arbitrary one of the communication terminal apparatus, and delivers the image signal superposed with the image signal of the arbitrary selling goods to the communication terminal apparatus.

Preferably, the image signal of selling goods is selected by an user of the communication terminal apparatus that originates the image signal to be superposed with the image signal of the selling goods.

Moreover, preferably, the image signal originated from the arbitrary communication terminal apparatus is an image signal including an image of the user of the communication terminal apparatus.

Moreover, preferably, the image signal transmitted among the plural communication terminal apparatus is an image signal including a real time moving image.

Moreover, preferably, in response to a demand from the communication terminal apparatus, to which the image signal is delivered, more detailed information of the selling goods is supplied to the communication terminal apparatus.

Moreover, preferably, an environment for performing transactions of the selling goods is supplied to the communication terminal apparatus to which the more detailed information of the selling goods is supplied.

Moreover, preferably, the image signal of the selling goods is superposed with the image signal originated from the communication terminal apparatus so that the image signal of the selling goods has substantially significant relation with an object included in the image signal originated from the communication terminal apparatus.

Moreover, preferably, the image signal of the selling goods is superposed with the image signal originated from the communication terminal apparatus so that an image in which the user of the communication terminal apparatus puts on the selling goods, uses the selling goods or holds the selling goods is generated.

Preferably, a consideration is paid to the user of the communication terminal apparatus to which the image signal of the selling goods is delivered in a state of being superposed with the originated image signal on a basis of a prescribed condition concerning the delivery of the image signal of the selling goods.

Specifically, the amount of the consideration is determined based on a number of times of the delivery of the superposed image signal of the selling goods, a period of time of the delivery, or a prescribed state to prescribed processing concerning the selling goods performed by the user of the communication terminal apparatus of a destination of the delivery.

Moreover, specifically, the consideration is paid by money, by countervailing of the consideration with a utility rate of the communication service, or by countervailing of the consideration with money to be paid at a time of prescribed selling goods transactions.

Specifically, the selling goods the image signal of which is superposed are further selected according to the user of the communication terminal apparatus to which the superposed image signal is delivered.

Preferably, the selling goods the image of which is superposed are changed in sequence at every series of the connection, at every prescribed period of time, in response to a demand from the communication terminal apparatus that originated the image to be superposed, or in response to a demand from the communication terminal apparatus that is a destination of the superposed image.

Moreover, a communication service apparatus according to the present invention comprises: connecting means for connecting a plurality of communication terminal apparatus in a state possible to transmit a audio and an image signals; receiving means for receiving the image signal originated from the connected communication terminal apparatus; image signal superposing means for superposing an image signal concerning arbitrary selling goods to the received image signal; and transmitting means for transmitting the superposed image signal to another of the connected communication terminal apparatus.

Preferably, the apparatus further comprises first recording means for recording the selling goods selected beforehand by each user concerning the communication terminal apparatus, the selling goods being superposed with the image signal originated from the communication terminal apparatus concerning the user, wherein the image signal superposing means selects the selling goods based on contents recorded in the first recording means, and superposes an image signal of the selected selling goods.

Moreover, preferably, the apparatus further comprises second recording means for recording information concerning the selling goods to be advertised, the information including image data of the selling goods, wherein the image signal superposing means selects the selling goods among various selling goods recorded in the second recording means, and performs superposition of the image signal by using the recorded image data of the selling goods.

Preferably, the connecting means connects the plural communication terminal apparatus in a state possible to transmit a real time moving image signal among the communication terminal apparatus.

Preferably, the image signal originated from the communication terminal apparatus includes an image of an user of the communication terminal apparatus, and the image signal superposing means superposes the image signal of the selling goods with the image signal originated from the communication terminal apparatus so that the image in which the user of the communication terminal apparatus puts on the selling goods, uses the selling goods or holds the selling goods is generated.

Moreover, preferably, the image signal superposing means changes the selling goods in sequence at every series of the connection, at every prescribed period of time, in response to a demand from the communication terminal apparatus that originated the image signal, or in response to a demand from the communication terminal apparatus that is a destination of the superposed image signal.

Moreover, preferably, the communication service apparatus further comprises: third recording means for recording prescribed data concerning actual results of superposition of image data of the selling goods with image data originated from the communication terminal apparatus at every user concerning the communication terminal apparatus; and adjusting means for paying a consideration to each user on a basis of contents recorded in the third recording means.

Moreover, preferably, the communication service apparatus further comprises fourth means for recording a hobby and a preference of the user of the communication terminal apparatus that is connected by the connecting means and receives delivery of the superposed image signal, wherein the image signal superposing means selects the selling goods further on a basis of contents recorded in the fourth recording means, and superposes the image signal of the selected selling goods.

Moreover, the transmitting means further transmits information of a destination of connection of a system supplying more detailed information of the selling goods or an environment for performing transactions of the selling goods to the communication terminal apparatus that transmitted the superposed image signal.

Moreover, a communication terminal apparatus according to the present invention is connected with another communication terminal apparatus mutually through a communication service apparatus, the communication terminal apparatus performing mutual telephone calling with the other communication terminal apparatus, the communication terminal apparatus comprises: telephone calling means for performing telephone calling with the connected other communication terminal apparatus; receiving means for receiving image data of a superposed image of an image signal originated from the other communication terminal apparatus and an image signal concerning arbitrary selling goods and a prescribed control data, the image data and the control data being transmitted from the communication service apparatus; displaying means for displaying the received image data; position designating means for designating an arbitrary position on the displayed image data; and controlling means for performing prescribed processing on a basis of the received control data when the designated position is a part of the superposed image of the image data.

Specifically, the controlling means demands more information of the selling goods concerning the superposed image signal or an environment concerning transactions of the selling goods to the communication service apparatus when the part of the superposed image is designated.

Moreover, specifically, the controlling means demands more information of the selling goods or an environment concerning transactions of the selling goods to the other communication service apparatus concerning the superposed image when the part of the superposed image is designated.

Preferably, the receiving means receives information of a replying result to the demand transmitted from the other communication service apparatus concerning the selling goods, and the displaying means displays the information of the received replying result.

Moreover, preferably, processing concerning the information from the other communication service apparatus in the receiving means and the displaying means and processing concerning the other communication terminal apparatus connected through the communication service apparatus are performed at a substantially same time.

Moreover, a communication system according to the present invention includes a plurality of communication terminal apparatus and a communication service apparatus for connecting the plural communication terminal apparatus possible to transmit an audio and an image signals, wherein the communication service apparatus comprises: receiving means for receiving an image signal originated from one of the connected communication terminal apparatus; image signal superposing means for superposing an image signal concerning arbitrary selling goods with the received image signal; and transmitting means for transmitting the superposed image signal to another of the connected communication terminal apparatus, and the communication terminal apparatus comprises: receiving means for receiving image data originated by another of the communication terminal apparatus and transmitted from the communication service apparatus; and displaying means for displaying the received image data.

Moreover, an advertisement propagandizing method according to the present invention, in a communication environment in which a plurality of communication terminal apparatus are connected in a state that an audio and an image signals can be transmitted, the advertisement propagandizing method selects selling goods of a desired advertisement propaganda object by an user of the communication terminal apparatus, and superposes an image signal of the selected selling goods of, the advertisement propaganda object with an image signal originated by the communication terminal apparatus concerning the user, and delivers the image signal in which the image signal of the selling goods is superposed to another communication terminal apparatus.

Moreover, the image signal originated from the communication terminal apparatus includes an image signal of the user of the communication terminal apparatus.

Moreover, the image signal of the selling goods is superposed with the image signal originated from the communication terminal apparatus so that an image in which the user of the communication terminal apparatus puts on the selling goods, uses the selling goods or holds the selling goods is generated.

Moreover, more detailed information of the selling goods or a transaction environment of the selling goods is supplied to the communication terminal apparatus to which the image signal is delivered in response to a demand from the communication terminal apparatus.

Moreover, a consideration is paid to the user of the communication terminal apparatus, to which the superposed image signal of the originated image signal and the image signal of the selling goods are delivered, on a basis of a prescribed condition concerning the delivery of the image signal of the selling goods.

Moreover, the selling goods the image signal of which is superposed are further selected according to the user of the communication terminal apparatus to which the superposed image signal is delivered.

According to the present invention, there can be provided a communication system, a communication service method and the apparatus thereof that are possible to provide an advertisement propagandizing service of selling goods and an electronic commerce environment in a private communication environment between specific users.

Moreover, there can be provided a communication terminal apparatus that can receive an advertisement propaganda service of selling goods and an electronic commerce environment while performing a private communication with a specific user.

Moreover, there can be provided an advertisement propagandizing method that can perform an advertisement propaganda service of selling goods in a private communication environment among specific users.

Moreover, there can be provided an information processing apparatus that superposes the advertisement propaganda information of desired selling goods with transmission data.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENT

An embodiment of the present invention is described by reference to the attached drawings.

In the present embodiment, the present invention is described by the illustration of a communication system in a visual (TV or video) telephone-form that is capable of transmitting live image signals between callers mutually, especially, capable of supplying a new commercial transaction environment by utilizing ordinary private communication as advertisement means.

First, the configuration of the communication system is described by reference to FIGS. 1-5.

Figure 1:
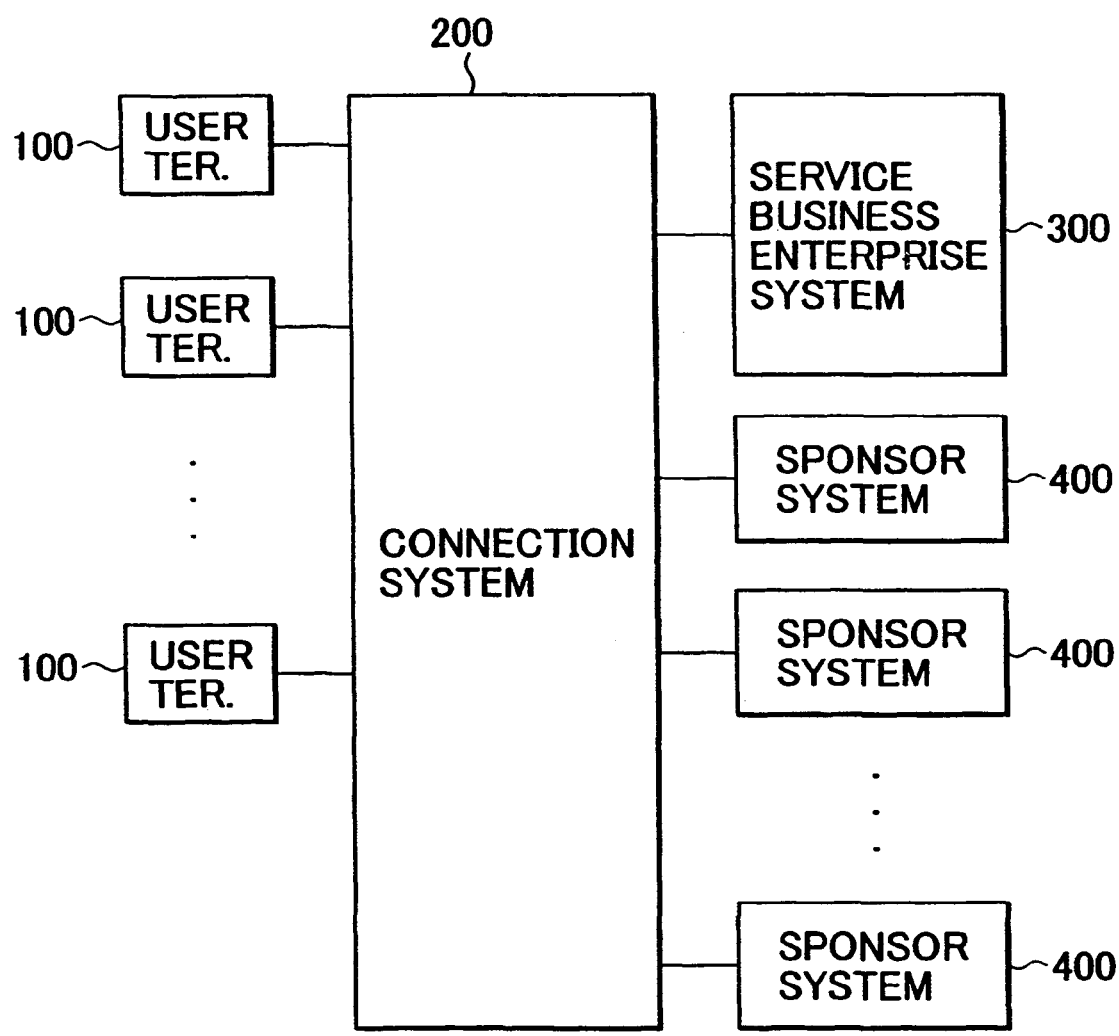
FIG. 1 is a block diagram showing the configuration of a communication system of an embodiment of the present invention.

FIG. 1 is a block diagram showing a basic configuration of a communication system 11.

As shown in the FIG. 1, the communication system 11 has a plurality of user terminal apparatus 100, a connection system 200, a service business enterprise system 300 and a plurality of sponsor systems 400 as its basic configuration.

The user terminal apparatus 100 are terminal apparatus for performing conversations between users by means of audio and image signals, and at the same time are terminal apparatus for performing the setting or the operations of communication services provided by the service business enterprise system 300 and for receiving selling goods transaction services provided by the sponsor systems 400.

The user terminal apparatus 100 have functions such as audio telephone calls, the display of images and the taking of images.

Figure 2:
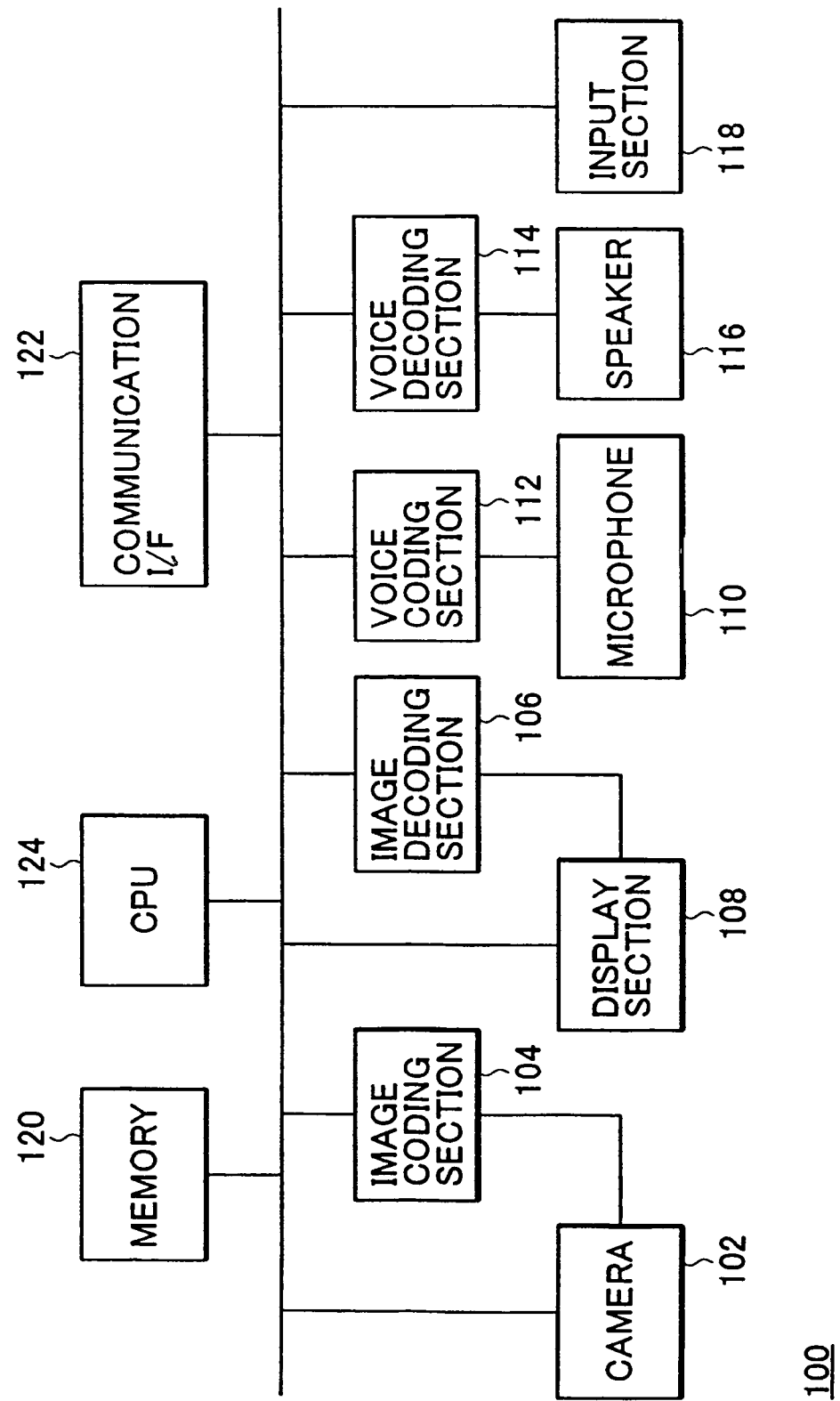
FIG. 2 is a block diagram showing the configuration of an user terminal apparatus of the communication system shown in FIG. 1.

The user terminal apparatus 100 are described by reference to FIG. 2.

The user terminal apparatus 100 includes a video camera 102, an image coding section 104, an image decoding section 106, a display section 108, a microphone 110, a voice coding section 112, a voice decoding section 114, a speaker 116, an input section 118, a memory 120, a communication I/F (Inter-Face) 122 and a CPU (Central Processing Unit) 124.

The camera 102 is a constituent element for taking images of a user in order to transmit a live image signal to a communication companion. Namely, the camera 102 is a small-sized CCD (Charge Coupled Device) camera disposed at a position where at least an image of a face of the user can be taken in a state that the user is ordinarily using the user terminal apparatus 100. Image signals obtained by the camera 102 are output to the image coding section 104.

The image coding section 104 codes the image signals input from the camera 102 in conformity with a prescribed system to output the coded signals to the communication I/F 122.

Coded image data of a communication companion, or coded image data to which advertisement information is added by the service business enterprise system 300, which will be described later, and coded image data of selling goods transmitted from the sponsor system 400, which will be described later, in some cases, are input into the image decoding section 106 from the communication I/F 122. The image decoding section 106 decodes the input coded image data to output the decoded image data to the display section 108. There are a case where only either of the two image data is input and a case where both of them are input substantially at the same time. Even in the case where both of them are simultaneously input, the image decoding section 106 decodes both of them substantially at the same time, so that it is possible to display them on the display section 108 at the same time, and outputs the decoded data to the display section 108.

The display section 108 displays the image data input from the image decoding section 106, for example, text data concerning selling goods input from the communication I/F 122 directly from the sponsor system 400, which will be described later, the information related to the usage states and the operations of the user terminal apparatus 100 input from the CPU 124, and the like on a display so that an user can visually recognize them.

Although it is not shown, the display section 108 has a display that displays images actually and a control section that generates signals to be superposed on the display. The image data input by the image decoding section 106 from the communication companion, the image data of the selling goods, the text data input from the communication I/F 122 and the CPU 124, and the like are superposed to a signal to be displayed on a screen by a control section, and are converted into a signal suitable for being input on the display, for example, and they are converted into an analog signal. Then the converted analog signal is imposed on the display to be displayed.

The microphone 110 takes in the outside voices or sounds including a user's voice at a time of telephone calling, and generates an audio signal to output the generated signal to the voice coding section 112.

The voice coding section 112 codes the audio signal input from the microphone 110 in conformity with a prescribed system to output the coded signal to the communication I/F 122.

The voice decoding section 114 decodes the coded audio data that is received by the communication I/F 122 and is input into the voice decoding section 114, and converts the coded audio data into an analog signal capable of being output from the speaker 116 to impose the converted signal on the speaker 116.

The speaker 116 outputs the audio signal input from the voice decoding section 114 as a voice.

The input section 118 is an operation section for performing various operations of an user such as the dialing to a destination of telephone calling, the setting of various functions of the user terminal apparatus 100, the setting of various services to the service business enterprise system 300, the designation of selling goods included in a live image signal from a communication companion, the operation for picking up the information, the various operations for selling goods introduction screen transmitted from the sponsor system 400. The input section 118 has a ten-key and an arbitrary pointing device.

The memory 120 memorizes a computer software program for the processing of the control of the whole user terminal apparatus 100 performed by the CPU 124 and various data such as setting data of the functions and the operations of the user terminal apparatus 100, data during processing in the CPU 124, data being transmitted between each constituent section, and data during processing in each constituent section.

Moreover, the destination information of the connection of the sponsor system 400 of the information of selling goods included in a live image signal from a communication companion for obtaining the more detailed information of the selling goods is stored in the memory 120 in sequence.

Incidentally, in the present embodiment, when the information of a plurality of selling goods is received at one time of communication, all of the destination information of connections of the sponsor systems 400 of the selling goods is stored in the memory 120. Moreover, the stored information is erased by the user terminal apparatus 100 when the next communication begins.

The communication I/F 122 performs the modulation and the demodulation of data, protocol control and so forth, and communicates with the outside actually.

Voice data input from the microphone 110 and coded by the voice coding section 112 and image data taken by the camera 102 and coded by the image coding section 104 are transmitted from the communication I/F 122. Incidentally, the transmitted data are finally transmitted to a communication companion through the connection system 200 and the service business enterprise system 300.

Moreover, the data transmitted from a communication companion through the service business enterprise system 300 and the connection system 200 is received by the communication I/F 122, and then the image data thereof is output to the image decoding section 106, and the voice data thereof is output to the voice decoding section 114, and the text data thereof is output to the display section 108, and the control data thereof is output to the CPU 124, respectively.

Moreover, when an user wants to obtain more detailed information of selling goods on the basis of the information of the selling goods included in a live image from a communication companion, the communication I/F 122 transmits a demand for the more detailed information of the selling goods generated by the CPU 124 on the basis of an operation of the input section 118 by the user to the sponsor system 400 concerning the selling goods through the connection system 200.

Moreover, when some information is transmitted from the sponsor system 400 in response to the demand, or when the connection with the sponsor system 400 is established, the communication I/F 122 receives the information transmitted from the sponsor system 400, and the image data thereof is output to the image decoding section 106, and the voice data thereof is output to the voice decoding section 114, and the text data thereof is output to the display section 108, and the control data thereof is output to the CPU 124, respectively.

The CPU 124 operates in conformity with programs stored in the memory 120 (preferably a ROM (Read Only Memory)) and controls each section of the user terminal apparatus 100 to perform desired operations.

Concerning the processing of the present invention, for example, there is the processing of the communication I/F 122 at the time of receiving the information of the advertisement information of selling goods added to a live image from a communication companion. In the processing, the communication I/F 122 extracts the destination information of connection of the sponsor system 400 concerning the selling goods included in the advertisement information, and stores the extracted destination information of connection in the memory 120 (preferably a RAM (Random Access Memory in this case)).

Then, when the operation for obtaining the detailed information of the selling goods is performed by the user, the CPU 124 requires the detailed information to the sponsor system 400 concerning the selling goods through the communication I/F 122 on the basis of the destination information of connection stored in the memory 120.

Moreover, when the CPU 124 performs the actually processing concerning a commercial transaction as a result of the communication with the sponsor system 400, the CPU 124 performs an authentication processing, an adjustment processing and the like therefore.

Moreover, when communication with a new destination of communication is begun, the CPU 124 performs the processing of erasing the destination information of the connection, which is stored in the memory 120, of the sponsor system 400 of the selling goods the advertisement information-of which is received in the communication at the last time.

In the user terminal apparatus 100 having such a configuration, the communication I/F 122 begins communication with an outside apparatus in conformity with the control of the CPU 124 by, for example, an operation of the input section 118 by an user.

After the securing of a channel, a voice pronounced by the user is taken in by the microphone 110 to be converted into a digital coded signal by the voice coding section 112. An image of the user is taken by the camera 102 to be converted into a digital coded signal by the image coding section 104. Moreover, additional information, control information and the like are generated by the CPU 124 on the basis of, for example, an operation of the input section 118 by the user as the need arises, and the generated information is transmitted through the communication I/F 122 respectively.

Moreover, audio signals and image signals in the form of digital coded signals, and additional information and control information as the need arises, are transmitted also from the outside to the user terminal apparatus 100. In the user terminal apparatus 100, the communication I/F 122 receives these signals and information, and the audio signals are decoded by the voice decoding section 114 to be output by the speaker 116, and the image signals are decoded by the image decoding section 106 to be displayed by the display section 108.

Moreover, the additional information and the control information are appropriately processed by the CPU 124 on the basis of the information.

The communication in the visual telephone-form by the use of live images with an arbitrary companion becomes possible by such an operation of the user terminal apparatus 100.

Moreover, in the present embodiment, signals composed of image signals, audio signals, both being transmitted from a communication companion, and some advertisement information of selling goods added to the image signals and the audio signals are transmitted to the user terminal apparatus 100 by the service business enterprise system 300, which will be described later. The advertisement information to be added includes image data of the selling goods to be added to the image signals, the information to be transmitted as control signals for prescribing the added image data part, the connection information of the sponsor system 400 concerning the selling goods, the information for prescribing the operations of the user terminal apparatus 100 in the case where the image data is selected by the user, and the like. When such signals are transmitted, the image signals thereof and the audio signals thereof are decoded by the image decoding section 106 and the voice decoding section 114, respectively, and are output by the display section 108 and the speaker 116, respectively, as described above.

The control signal is stored in the memory 120 by the CPU 124, and is referred in the case where the user performs some operation of the input section 118, or the like. That is, prescribed processing is executed on the basis of the stored information that prescribes operations. To put it more concretely, for example, the following processing is performed: the operations and instructions of the user are detected by reference to the information prescribing a stored image data part; the detailed information concerning selling goods is demanded to the sponsor system 400 by reference to stored connection information; and the connection with the sponsor system 400 is performed.

The user terminal apparatus 100 performs the communication with the sponsor systems 400 after that, and the processing such as the acquisition of the information concerning the selling goods or the order of the selling goods is executed by the aforesaid communication function.

However, in the case where the user terminal apparatus 100 has an authentication function or the function of specific adjustment processing, the CPU 124 utilizes these functions when actual selling goods transactions are performed.

Moreover, as mentioned above, the communication I/F 122 can perform simultaneous communication with a plurality of destinations of communication, and also the display section 108 can display a plurality of images at the same time. Consequently, it is possible to do at the same time the communication with a desired companion in the visual telephone-form, which is described first, and the communication with the sponsor system 400 concerning the selling goods that is detected at that time and the display of the information of the selling goods.

The mentioned above are the configuration of the user terminal apparatus 100 and the operations thereof.

The connection system 200 provides a communication network comprising nodes including the user terminal apparatus 100, the service business enterprise system 300 and the sponsor systems 400, and the connection system 200 connects arbitrary nodes to each other in the communication network in response to a demand from each of the node apparatus to enable communication between each apparatus.

As the processing related to the present embodiment, because the user terminal apparatus 100 makes a connection demand on the service business enterprise system 300 primarily in the case where communication between the user terminal apparatus 100 is performed, the connection system 200 connects the user terminal apparatus 100 with the service business enterprise system 300 in the network on the basis of the connection demand. Then, the connection system 200 secondarily connects the service business enterprise system 300 with the user terminal apparatus 100 that is a telephone call companion in response to an demand of the service business enterprise system 300 after that.

Thereby, there is provided an environment in which the user terminal apparatus 100, which demanded the connection, and the user terminal apparatus 100 being a communication companion can communicate through the service business enterprise system 300.

Moreover, the connection system 200 connects the user terminal apparatus 100 and the sponsor system 400 in the network on the basis of a demand from the user terminal apparatus 100 or the sponsor system 400.

Moreover, when the service business enterprise system 300 introduces an user to the sponsor system 400 or the like, the connection system 200 transmits the information concerning the user from the service business enterprise system 300 to the sponsor system 400 or connects them with each other in response to a demand from the service business enterprise system 300.

Incidentally, the connection system 200 connects each apparatus by channels in various forms, but the connection system 200 connects the user terminal apparatus 100 to each other by means of a channel having an enough bandwidth through which real-time moving image signals can be transmitted finally.

The service business enterprise system 300 is a system that provides a communication environment in which advertisement information intervenes in usual private communication to each of the user terminal apparatus 100.

The service business enterprise system 300 basically mediates the connection among a plurality of the user terminal apparatus 100 and provides communication services in the visual telephone-form that includes the mutual transmission of moving image signals to these user terminal apparatus 100 and, at that time, the service business enterprise system 300 makes the addition of advertisement information and the development to selling goods transaction processing therefore possible by superposing the image data of desired selling goods selected by an user himself or herself with a transmitted live image signal, and further by adding information enabling the immediate communication with the sponsor system 400 concerning the selling goods in response to a demand of an user on the reception side.

The service business enterprise system 300 having the aforesaid functions will be described by reference to FIGS. 3-5.

Figure 3:
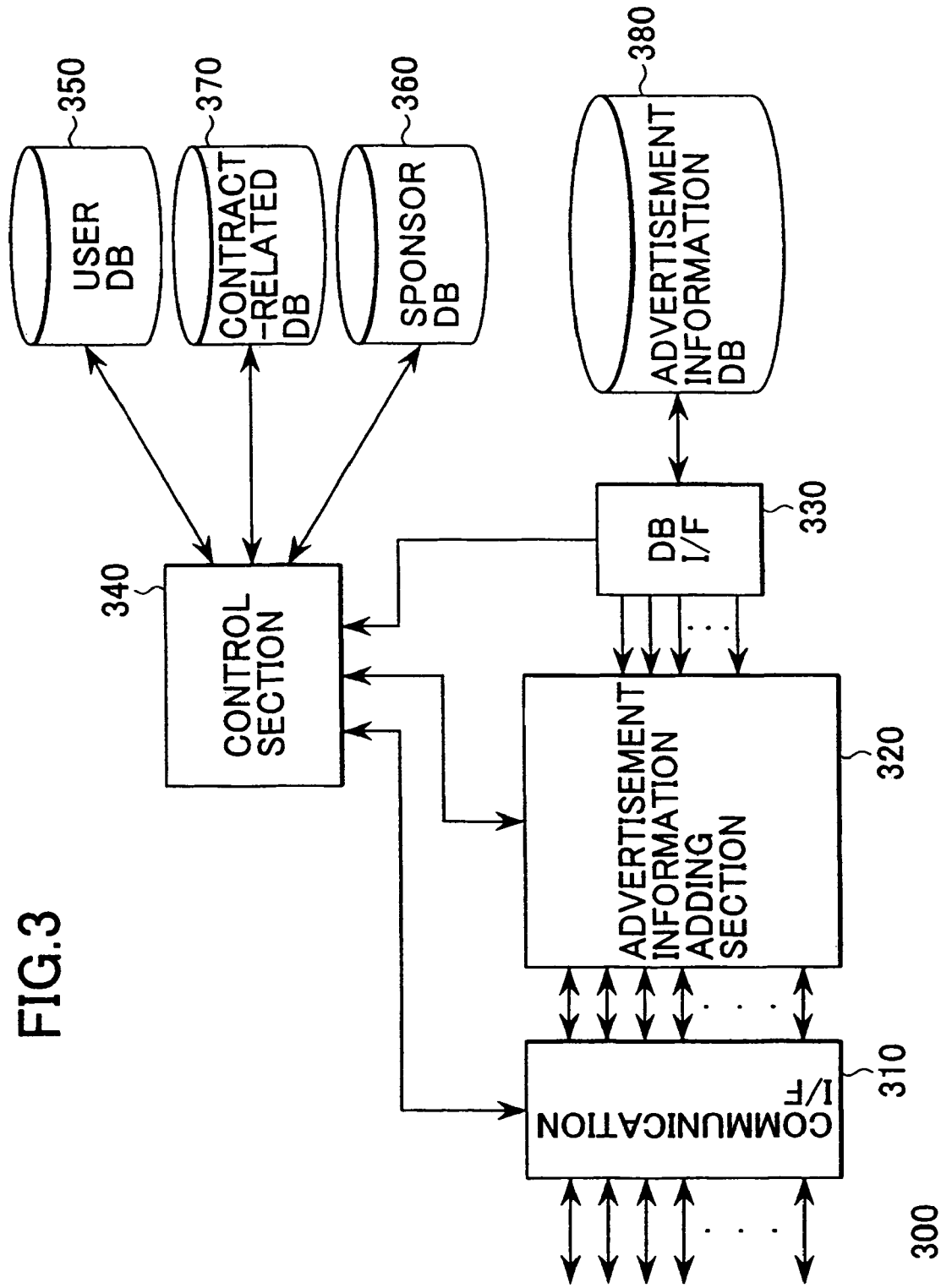
FIG. 3 is a block diagram showing a configuration of a service business enterprise system of the communication system shown in FIG. 1.

FIG. 3 is a block diagram showing the constitution of the service business enterprise system 300.

As shown in FIG. 3, the service business enterprise system 300 comprises a communication I/F 310, an advertisement information adding section 320, a database I/F 330, an user database 350, a sponsor database 360, a contract-related database 370, an advertisement information database 380 and a control section 340.

The communication I/F 310 is an interface that communicates with an arbitrary destination of communication through the connection system 200, and communicates especially with the user terminal apparatus 100 in the present embodiment.

When the user terminal apparatus 100 makes a connection demand on the communication I/F 310 through the connection system 200, the communication I/F 310 receives the demand and establishes a channel with the user terminal apparatus 100. Then, when a signal indicating some demand, setting and so forth is input from the user terminal apparatus 100, the communication I/F 310 outputs the signal to the control section 340.

In the case where the user terminal apparatus 100 demands the setting of a communication environment and a communication condition, or the like such as the alteration of the condition concerning the processing of the addition of advertisement information, the selection of selling goods or a sponsor, or the like, because some response to the demand is input into the communication I/F 310 from the control section 340, the communication I/F 310 transmits the response back to the user terminal apparatus 100.

Moreover, when the user terminal apparatus 100 demands the communication with another user terminal apparatus 100, because the communication I/F 310 is instructed by the control section 340 to connect the user terminal apparatus 100 with the user terminal apparatus 100 of the communication companion on a line, the communication I/F 310 demands the connection to the connection system 200 on the basis of the instruction. Thereby, a channel is established between the user terminal apparatus 100 that demanded the communication and the user terminal apparatus 100 of the communication companion.

After the channel is established, the communication I/F 310 receives signals including image signals and audio signals that are input from each user terminal apparatus 100, and outputs them to the advertisement information adding section 320. Moreover, the communication I/F 310 transmits signals including image signals and audio signals that are input from the advertisement information adding section 320 to each user terminal apparatus 100.

The advertisement information adding section 320 adds advertisement information to the transmission data between the user terminal apparatus 100, which are input from the communication I/F 310, as the occasion demands in conformity with the settings set by the user who communicates with the user terminal apparatus 100 that transmitted the transmission data.

Audio data, image data and control data that are transmitted from each user terminal apparatus 100 are input to the advertisement information adding section 320 through the communication I/F 310.

Because the advertisement information adding section 320 does not add any advertisement information to the audio data in the present embodiment, the advertisement information adding section 320 outputs input audio data to the communication I/F 310 as they are as the transmission data to the user terminal apparatus 100 of the communication companion.

As for the image data, in the case where an user who transmitted the transmission data set to add advertisement information, the advertisement information adding section 320 superposes the image data of the advertisement information of specific selling goods selected by the user that is input from the database I/F 330 into a part of the transmitted image data that is, for example, a live image of the user and outputs the superposed image data to the communication I/F 310 as transmission data to the user terminal apparatus 100 of the telephone calling companion.

In particular, the advertisement information adding section 320 of the present embodiment superposes the image data of selling goods of the object of advertisement in a way that is fitted to the live image of an user. To put it more concretely, the advertisement information adding section 320 superposes the image signal in the form that the image indicating the selling goods is used by the user or used as the background thereof, or in the form that the selling goods itself is worn by the user or held by the user or laid in the space in which the user exists.

In the case where the advertisement image data are thus superposed, in order that the user can actually obtain further information concerning the selling goods or can perform the transaction thereof on the basis of the advertisement information, the advertisement information adding section 320 adds additional information of the advertisement information of the selling goods that is input from the database I/F 330 together with the image data, or, to put it concretely, the information prescribing a superposed image data part, the connection information of the sponsor system 400 concerning the selling goods, and the information prescribing the operations of the user terminal apparatus 100 when the image data is selected by the user related to the user terminal apparatus 100, to the control data transmitted from the user terminal apparatus 100, and the advertisement information adding section 320 outputs the added control data to the communication I/F 310 as transmission data to the user terminal apparatus 100 of the telephone calling companion.

Moreover, in the case where an user did not set to add the advertisement information, both of the image data and the control data, which are input from the communication I/F 310 into the advertisement information adding section 320, are output to the communication I/F 310 from the advertisement information adding section 320 as they are as the transmission data to the user terminal apparatus 100 of the communication companion like the audio data.

Incidentally, the processing of investigating the setting by an user and of controlling the operations of the advertisement information adding section 320 when the advertisement information adding section 320 performs such processing is actually done by the control section 340 that will be described later. Accordingly, the advertisement information adding section 320 performs the aforesaid processing by the use of the advertisement image data that is input from the database I/F 330 by the control of the control section 340 as the need arises on the basis of control signals that are input from the control section 340.

As for the constitution of the advertisement information adding section 320 for performing such processing, especially, the constitution of a part thereof for processing the addition of advertisement image data to image data will be described by reference to FIGS. 4 and 5 more minutely.

Figure 4:
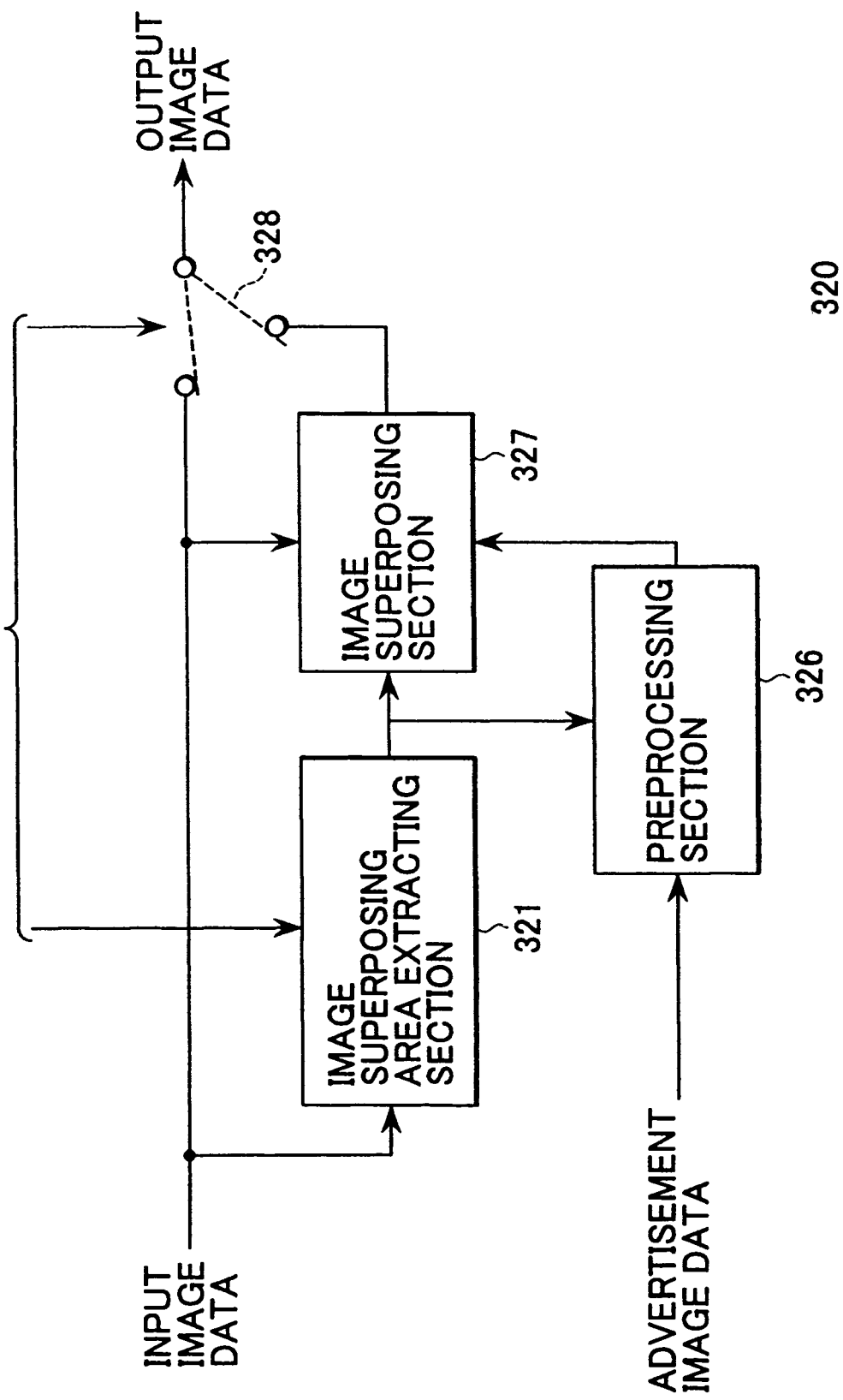
FIG. 4 is a block diagram showing the configuration of a part in the advertisement information adding section of the service business enterprise system shown in FIG. 3 for processing the addition of advertisement image data to image data.

FIG. 4 is a block diagram showing the constitution of a part that performs the processing to add advertisement image data to the image data in the advertisement information adding section 320.

The advertisement information adding section 320 has an image signal superposing area extraction section 321, a preprocessing section 326, an image superposing section 327 and a switching section 328.

The image superposing area extracting section 321 decides an object the advertisement image data of which is superposed on the basis of input image data and the information of the object that is preferable for the superposition of the advertisement image data to be superposed, which is input from the control section 340, and outputs the information prescribing the area of the object to the preprocessing section 326 and the image superposing section 327.

The constitution and the operations of the image superposing area extracting section 321 will be described in detail by reference to FIG. 5.

Figure 5:
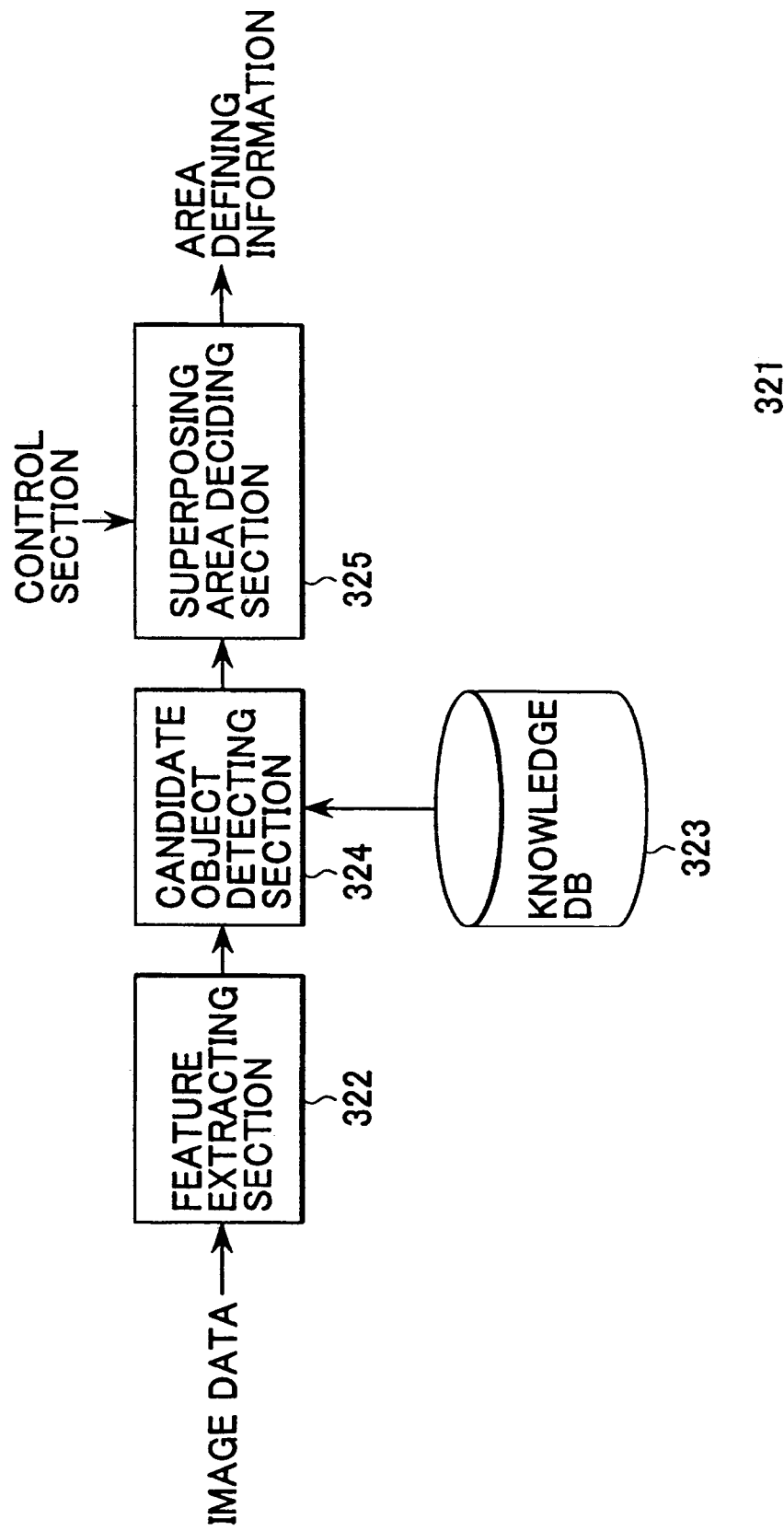
FIG. 5 is a block diagram showing the configuration of the image signal superposing area extracting section in the advertisement information adding section shown in FIG. 4.

FIG. 5 is a block diagram showing the constitution of the image superposing area extracting section 321 shown in FIG. 4.

The image superposing area extracting section 321 has a feature extracting section 322, a knowledge database 323, a candidate object detecting section 324 and a superposing area deciding section 325.

The feature extracting section 322 extracts a prescribed feature points, for example, a changing point of luminance, a changing point of color, a point of a specific color and the like, and outputs the information is of the extracted feature points to the candidate object detecting section 324.

The knowledge database 323 is a database storing the objects in input image data that the image superposition area extracting section 321 is going to recognize in a form prescribed by feature points being detection objects of the candidate object detecting section 324. Herein, the aforesaid objects are image data generated by taking of the data of objects having a possibility of being replaced by advertisement image data or of being superposed with the advertisement image data by the user terminal apparatus 100. A plurality of data of each object are recorded at every state corresponding to some typical image data having high possibilities of being generated in cases where the user terminal apparatus 100 are ordinarily used to take ordinarily conceivable scenes.

Moreover, the knowledge database 323 stores other features such as "the face and the hands have the same color as that of the skin." besides the dispositions of the feature points of each object, or features of relative positional relationships of each object; for example, "an outerwear is disposed below a face, and hands locate on the both sides thereof."

The candidate object detecting section 324 compares the configuration of a feature point extracted by the feature extracting section 322 with the data of each object recorded in the knowledge database 323, and refers the other features other than the disposal of the feature point and the features of relative positional relationships with the already detected objects, and thereby detects the area of a specific object having a possibility of being replaced or superposed by advertisement image data in the input image data. The information of the detected object is output to the superposing area deciding section 325.

The superposing area deciding section 325 decides an object for superposing a final advertisement image data on the basis of the information of the detection result of the object input from the candidate object detecting section 324 and the information that is preferable for the superposing of the advertisement image data and is input from the control section 340. The information of the objects that are possible to be superposed and are beforehand set at every selling goods and the information of the order of priority of the objects are input into the superposing area deciding section 325 from the control section 340.

Accordingly, the superposing area deciding section 325 checks whether or not any object possible to be superposed is detected by the candidate object detecting section 324 in sequence from the higher order of priority, and decides the object that is detected as the object being the superposed object.

Then, the superposing area deciding section 325 outputs the information that prescribes the area of the object from the image superposed area extracting section 321.

The aforesaid is the description of the constitution of the image superposing area extracting section 321.

The preprocessing section 326 of the advertisement information adding section 320 converts the advertisement image data of the superposed object read out from the advertisement information database 380 and input through the database I/F 330 to data having a size and a shape possible to be superposed to the area of the superposing object extracted by the image superposing area extracting section 321, and outputs the converted data to the image superposing section 327.

The image superposing section 327 superposes the data in the superposing object area input from the image superposing area extracting section 321 and the advertisement image data input from the preprocessing section 326 among the input data, and outputs the image data of the result of the superposing to the switching section 328. In the present embodiment, the image superposing section 327 merely replaces the data in the area of the superposing object of the input image data with the advertisement image data and outputs the replaced data.

The switching section 328 selects input image data in the case where an user did not set to add advertisement information, and selects the image data superposed by the image superposing section 327 in the case where the user set to add the advertisement information on the basis of the control signal from the control section 340, and then the selected data are respectively output to the communication I/F 310.

The aforesaid is the description of the constitutional section concerning the processing of the image data in the advertisement information adding section 320.

The database I/F 330 of the service business enterprise system 300 reads out the advertisement information of desired selling goods from the advertisement information database 380 under the control of the control section 340, and outputs the read out advertisement information to the advertisement information adding section 320 through a prescribed channel. A plurality of input-output channels possible to output image data concurrently are provided between the database I/F 330 and the advertisement information adding section 320, and the database I/F 330 virtually concurrently reads out a plurality of pieces of advertisement information and outputs the read out advertisement information to the advertisement information adding section 320 through the prescribed channels.

Incidentally, the advertisement information read out from the advertisement information database 380 has the advertisement image data and the additional information of the selling goods.

The user database 350 is a kind of database which records the various management data of the user who uses the communication service provided by the service business enterprise system 300.

The user database 350 records the management data such as the name, the ID (Identification), the destination information of connection management data of each user and the adjustment data concerning the utilization of services. Moreover, the setting whether each user approves the usage of his or her live image as an advertising medium or not is also recorded.

The sponsor database 360 is a kind of database storing various data on the sides of sponsors which use the advertisement propagandizing services to the live image in the private communication by the service business enterprise system 300.

The sponsor database 360 stores the information such as the sponsor of each selling goods that are desired to be advertised, the destination information of connection to the sponsor, the address information for the reading out of the advertisement information of the selling goods by the advertisement information database 380, and a preferable superposed form at the time of the superposing of the selling goods to the live image signal.

The contract-related database 370 stores the information such as the contracts with the users, who approved the usage of their live image signals as the advertisement media, for the actual usage as the advertisement media, the setting thereof, and the conditions thereof. To put it concretely, information such as the selling goods, the ways of exchanging the advertisements, the advertisement orders of priority, and the consideration receiving ways of advertisement objects selected by each user are recorded.

The advertisement information database 380 is a kind of database recording the advertisement information of each selling goods of the advertisement object is recorded.

In the advertisement information database 380, the advertisement information of every selling goods, i.e. the image data and the additional information of the selling goods are recorded. The additional information contains the connection information of the sponsor system 400 of the sponsor of selling goods and the information that prescribes the operations of the user terminal apparatus 100 when the image data are chosen by the user.

Then, the information concerning the selling goods of an advertisement object is read out at high speed by the database I/F 330 from the advertisement information database 380. Moreover, the advertisement information of new selling goods transmitted from a sponsor is appropriately recorded in the advertisement information database 380 through the database I/F 330.

The control section 340 appropriately adds advertisement information to data to be transmitted between users, and controls each section of the service business enterprise system 300 so that the service business enterprise system 300 can appropriately provide advertisement propaganda environment to the user terminal apparatus 100 and the sponsor system 400 that are connected by the connection system 200.

To put it concretely, first, the control section 340 performs desired processing correspondingly to various demands which are input from the user terminal apparatus 100 and the sponsor system 400 through the communication I/F 310.

For example, in the case where the sponsor system 400 makes demands such as the utilization of the advertisement service provided by the service business enterprise system 300, and the new registration and the erasure of selling goods of an advertisement object, the control section 340 appropriately updates the sponsor database 360 and the advertisement information database 380 on the basis of the demands.

Moreover, in the case where a new user demands his or her registration, the control section 340 appropriately performs sessions with the user terminal apparatus 100 through the communication I/F 310 to obtain various pieces of information which are necessary to the registration, and the control section 340 performs the investigation of the user as the occasion demands. Then, if the user passes the investigation, the control section 340 records the information in the user database 350 and registers the user.

Moreover, in the case where the user terminal apparatus 100 performs the setting as to whether the user approves that a live image of the user to be transmitted to a communication companion is utilized as an advertisement medium or not, and in the case where the user selects selling goods or demands to change the setting or the selection in the case where the, user approves the utilization, the control section 340 updates the contents of the contract-related database 370 on the basis of the user's demands.

Moreover, when the user terminal apparatus 100 demands the communication with another user terminal apparatus 100, the control section 340 instructs the communication I/F 310 to connect the demanded user terminal apparatus 100 with the user terminal apparatus 100 of the communication companion.

Then, referring to the user database 350, the control section 340 judges whether or not the user terminal apparatus 100 that demanded the communication and the user terminal apparatus 100 of the communication companion are respectively performed the setting to use their live images as advertising media.

When the user terminal apparatus 100 performed such setting, referring to the contract-related database 370, the control section 340 reads out the contents of the setting, i.e. the information which selling goods are changed at which timing while performing the superposing of the advertisement information of the selling goods.

Moreover, the control section 340 instructs the database I/F 330 to read out the advertisement information of the selling goods to be superposed and to output the read out advertisement information to a prescribed channel of the advertisement information adding section 320.

Moreover, the control section 340 controls the operations of the advertisement information adding section 320 so that advertisement image signals are appropriately superposed according to the setting read out from the contract-related database 370 when communication is begun between the user terminal apparatus 100.

Next, the operations of such communication system 11 will be described by reference to FIGS. 6-8.

Figure 6:
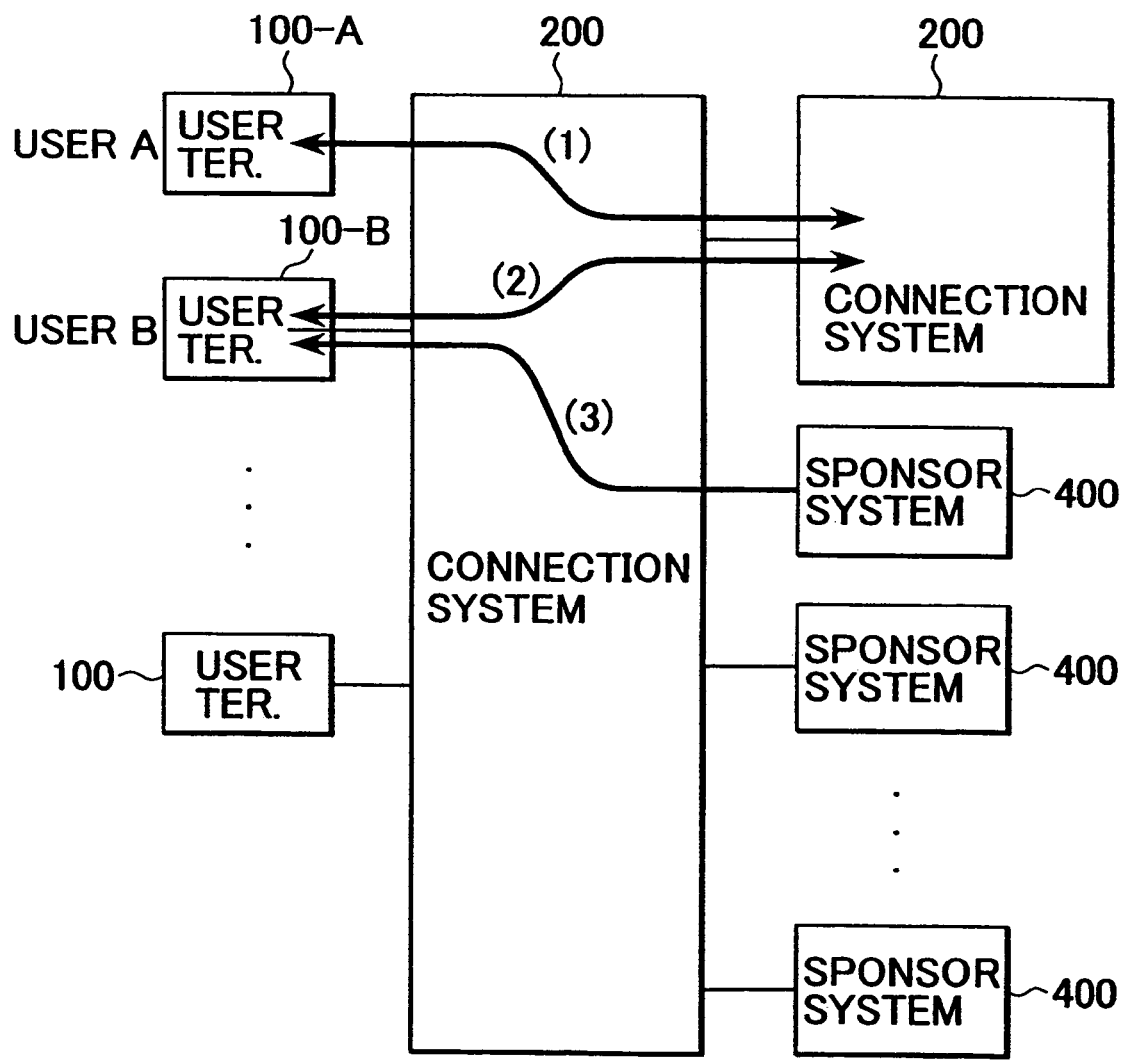
FIG. 6 is a figure for illustrating the operations of the communication system shown in FIG. 1.

FIG. 6 is a figure for illustrating the operations of the communication system 11.

First, an user A performs the setting of the use of the user's live image signal as the advertising medium beforehand and the selection of commodities to the service business enterprise system 300.

When the user A tried to communicate with an user B by the visual telephone-form using live image signals under such a situation, the user A demands the connection with the user terminal apparatus 100-B of the user B from the user terminal apparatus 100-A to the service business enterprise system 300 through the connection system 200-(1).

In the service business enterprise system 300, the demand is input into the control section 340 through the communication I/F 310, and the demand of the connection to the user terminal apparatus 100-B of the user B is made from the communication I/F 310 to the connection system 200 under the control of the control section 340.

Each circuit connection among the user terminal apparatus 100-A of the user A, the user terminal apparatus 100-B of the user B and the service business enterprise system 300 is established by the calling of the user terminal apparatus 100-B of the user B by the connection system 200 and by the setting of the user terminal apparatus 100-B by the user B to a telephone calling state (200-(2)).

On the other hand, the control section 340 of the service business enterprise system 300 retrieves the information of the user A and the user B in the user database 350 when the control section 340 receives the connection demand from the user A, and checks whether the user A and the user B respectively performed the setting to use each live image signal as an advertisement medium or not.

As a result, because the user A performed such setting, the control section 340 reads out the information such as the selling goods, changing conditions of the selling goods, and consideration reception methods from the contract-related database 370, and the control section 340 reads out the information such as the address of the advertisement information database 380 in which the advertisement information of the selling goods is recorded and the superposed form at the time of the superposing of the selling goods from the sponsor database 360.

Then, on the basis of the read out information, the control section 340 instructs the database I/F 330 to read out the data of the selling goods of the advertisement object from the advertisement information database 380, and instructs the advertisement information adding section 320 to superpose the image data of the selling goods to a live image signal in a fashion that the user and the sponsor desire, respectively.

When the live image signal to be transmitted to the user terminal apparatus 100-B is input to the service business enterprise system 300 from the user terminal apparatus 100-A of the user A in such a state, the advertisement information adding section 320 superposes the image signal of the selling goods of the advertisement object on the live image signal, and the superposed image signal is transmitted to the user terminal apparatus 100-B of the user B.

Figure 7:
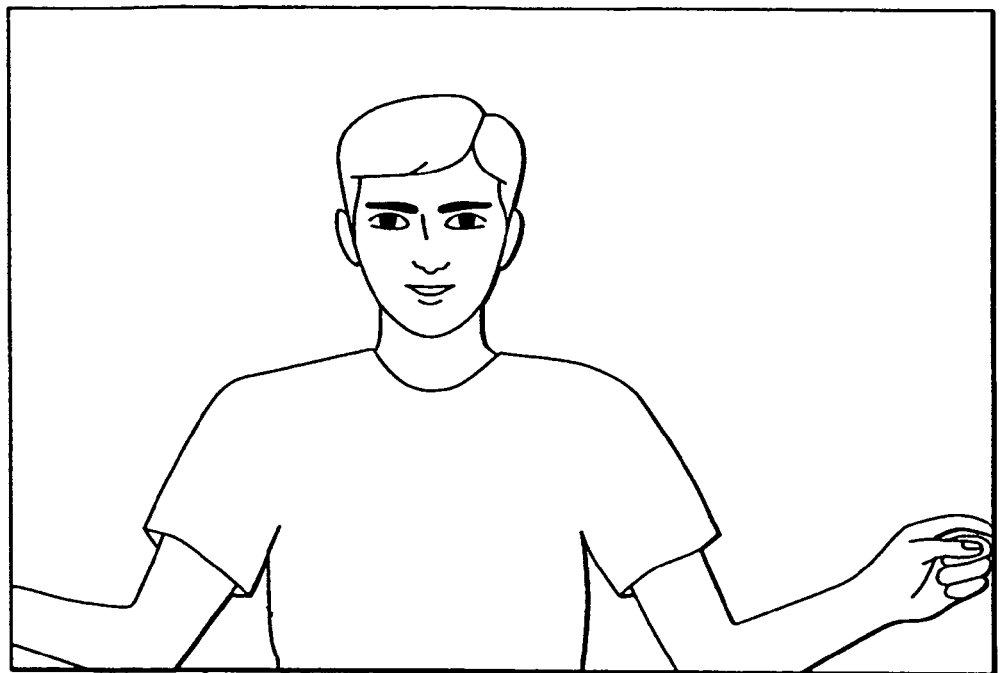
FIG. 7 is a figure showing a live image signal to be transmitted to a service business enterprise system from an user terminal apparatus on the transmission side in the communication system shown in FIG. 1.
Figure 8:
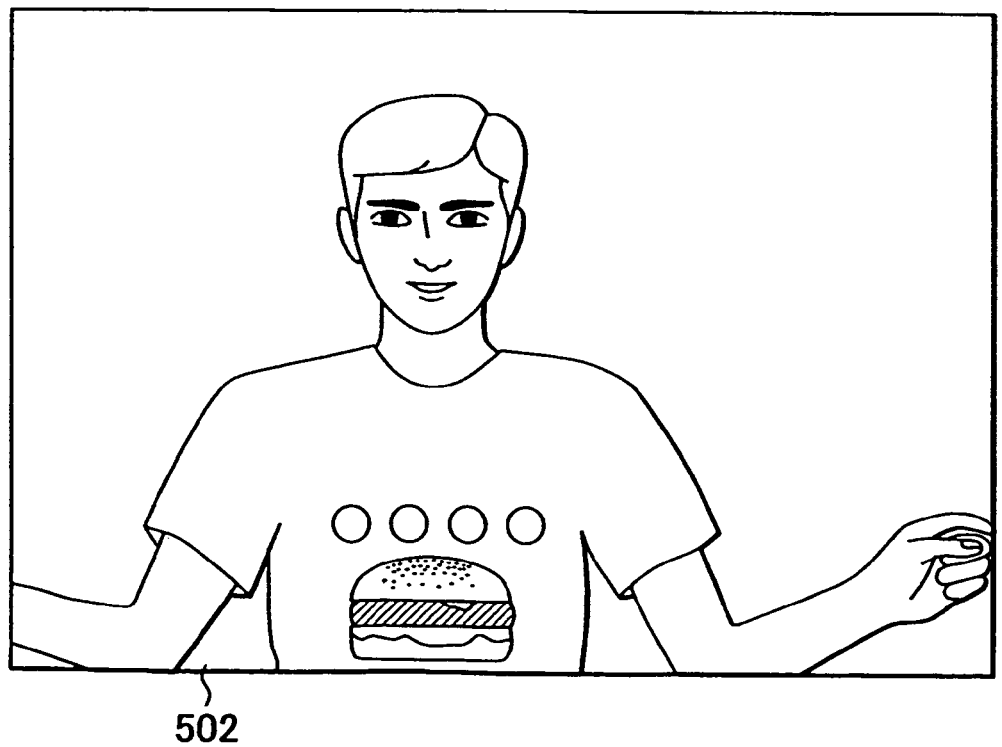
FIG. 8 is a figure showing an image signal, in which image signal of selling goods is superposed, to be transmitted to the user terminal apparatus on the transmission side from the service business enterprise system in the communication system shown in FIG. 1.

For example, in the case where a live image signal 500 shown in FIG. 7 is input, and the selling goods of the advertisement object are a hamburger, and further the superposed form of the selling goods is a condition of "printing the picture of the selling goods on the clothes", an image that a pattern 502 of a hamburger is printed on the T shirt that the user A wears as shown in FIG. 8 is transmitted to the user B.

Moreover, at this time, the information such as the area where the image data of the advertisement object as selling goods is displayed, the address of the sponsor system 400 of the sponsor of the selling goods, and the destination of connection is transmitted to the user terminal apparatus 100-B of the user B at the same time as control data together with the superposed image data.

The processing in the advertisement information adding section 320 for generating a superposing image signal as shown in FIG. 8 will be described.

First, feature points such as the luminance changing points, the color changing points and the representative points of colors of the live image signal as shown in FIG. 7 are detected by the feature extracting section 322 in the image superposing area extracting section 321 of the advertisement information adding section 320.

Next, the information stored in the knowledge database 323 where the shapes of faces, hands and outerwear are beforehand recorded is actively utilized by the candidate object detecting section 324, and objects such as those faces, hands and outerwear are detected in the image signal which is composed of the feature points. For example, objects such as the face, the hands and the outerwear are detected in the image as shown in FIG. 7.

Then, the object according to the information of the superposed form of the advertisement object as selling goods input from the control section 340 is selected among the detected objects by the superposing area deciding section 325, and the area information of the selected object is output to the preprocessing section 326 and the image superposing section 327. For example, if superposed forms such as "on the plane in the background", "outerwear" and "hand" are set to the selling goods of "hamburger" in the order, the "outerwear" at the second place in the order agrees with the information. Consequently, the area information in the live image of the outerwear is output.

Next, the preprocessing section 326 in the advertisement information adding section 320 transforms the image data input from the advertisement information database 380 through the database I/F 330, i.e. the image data of "hamburger" to the image data having an appropriate size and shape for the embedding into the area detected by the image superposing area extracting section 321, and outputs the resulted image data to the image superposing section 327.

Then, in the image superposing section 327, the image data of the hamburger input from the preprocessing section 326 is superposed in an area of the outerwear of the live image signal input from the image superposing area extracting section 321, and then the image as shown in FIG. 8 is generated.

The generated superposed image data is selected by the switching section 328 and is transmitted to the user terminal apparatus 100-B of the user B through the communication I/F 310.

Now, when the user B who is talking with the user A over the telephone and to whom an image, for example, shown in FIG. 8 is transmitted takes an interest in the hamburger printed on the T shirt of the user A, it is expected that the user B asks the user A what the hamburger is as an ordinary action.

On the other hand, the possibility that the user A has some knowledge about the hamburger and has a good feeling to the hamburger is high because they are the selling goods that the user A selected as an advertisement object of his or her own accord.

Consequently, if the user B asks the user A about the hamburger, there is high possibility that the user A explains the hamburger being the selling goods and gives utterance recommending and urging the purchase of the selling goods by the remarks such as "it is delicious" or "why not try it once".

As a result, the effect of the advertisement propaganda is obtained more than the image of the object is simply provided to the user B.

Regardless of the existence of such a conversation between the users, when the user B takes an interest in the hamburger and wants to know the detailed information, for example, the price thereof, the selling period thereof, the nearest purchasable place and the like, the user B performs the selection operation of the hamburger on the user terminal apparatus 100-B.

As mentioned above, the information indicating the image area of the advertisement object as selling goods, the destination information of connection of the sponsor system 400 of the sponsor of the selling goods and the information prescribing the operations of the user terminal apparatus 100-B in the case where the image of the selling goods is selected as the need arises are transmitted to the user terminal apparatus 100-B in addition to the live image including the superposing image signal of the advertisement object as selling goods.

Consequently, the user terminal apparatus 100-B performs the prescribed operation by the selection of the image of the selling goods by the user B. In the present embodiment, by the selection of the image data of the selling goods, the demand of information or the demand of communication is made by the user terminal apparatus 100-B to the sponsor system 400 of the sponsor of the selling goods.

As a result, the sponsor system 400 accesses to the user terminal apparatus 100-B of the user B, and then the further information of the selling goods is transmitted. Moreover, in some cases, the purchase of the selling goods can be applied, too, (200-(3)).

Incidentally, along with such processing, the control section 340 of the service business enterprise system 300 totals up the information of the actual results of the processing concerning the advertisement propaganda, namely the number of times or the period of time of the usage after the superposed of the image data of the selling goods, the number of times of the selection of the selling goods at the destination of advertisement, the fact whether the selling goods are finally purchased or not, and the like, at every user who is advertisement medium, and at every selling goods, and stores the totaled up information in the user database 350 and the sponsor database 360.

Then, the control section 340 performs the processing of paying a prescribed consideration to each user who is an advertising medium on the basis of the information of the actual usage results appropriately.

As described above, according to the communication system 11 of the present embodiment, a live image which is used in a private communication environment among ordinary users can be used as an advertisement propaganda environment of the selling goods or an electronic transaction environment.

Then, especially, such advertisement propaganda is performed in a way that an user advertises the selling goods which the user selected personally on the basis of the experience and the judge of himself or herself to the private companion. Consequently, the effect thereof is very high.

Incidentally, the present invention is not limited to the present embodiment and arbitrary and suitable various alterations are possible.

For example, the superposing form of the image signal of selling goods performed by the advertisement information adding section 320 of the service business enterprise system 300 is not limited to the example shown in FIG. 8, and a various forms are available.

For example, the place where the image data of selling goods is embedded may be an optional place in a transmitted live image.

Figure 9:
FIG. 9 is a first figure showing another form to superpose an image signal of selling goods in the service business enterprise system shown in FIG. 1.
Figure 10:
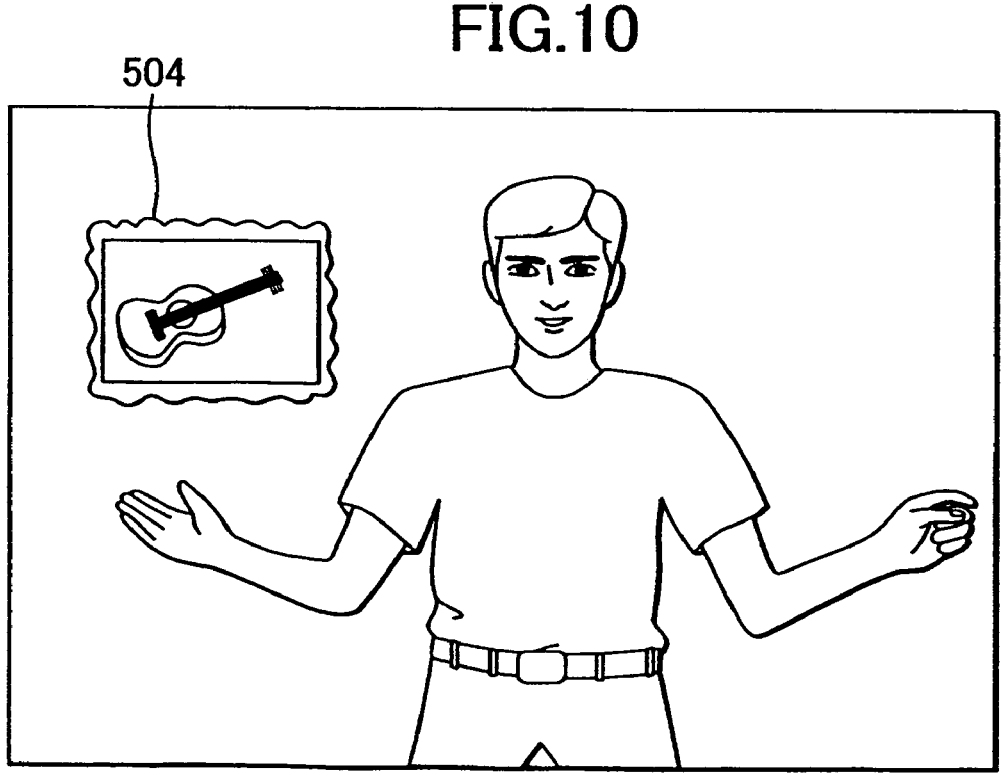
FIG. 10 is a second figure showing a further form to superpose an image signal of selling goods in the service business enterprise system shown in FIG. 1.

For example, an image 503 of selling goods may be superposed in a horizontal plane part in the background image as shown in FIG. 9, and an image 504 of selling goods may be superposed in a perpendicular plane part in the background image as shown in FIG. 10. In the former case, the image with reality as if the selling goods are placed on the horizontal plane such as a desk can be obtained, and in the latter case, the image with reality as if the selling goods are hung on a wall or a picture of the selling goods is hung on the wall can be obtained.

Moreover, in the first place, the image of a selling goods may be superposed in a form as if the user taken by a video camera in the live image is using the selling goods.

Figure 11:
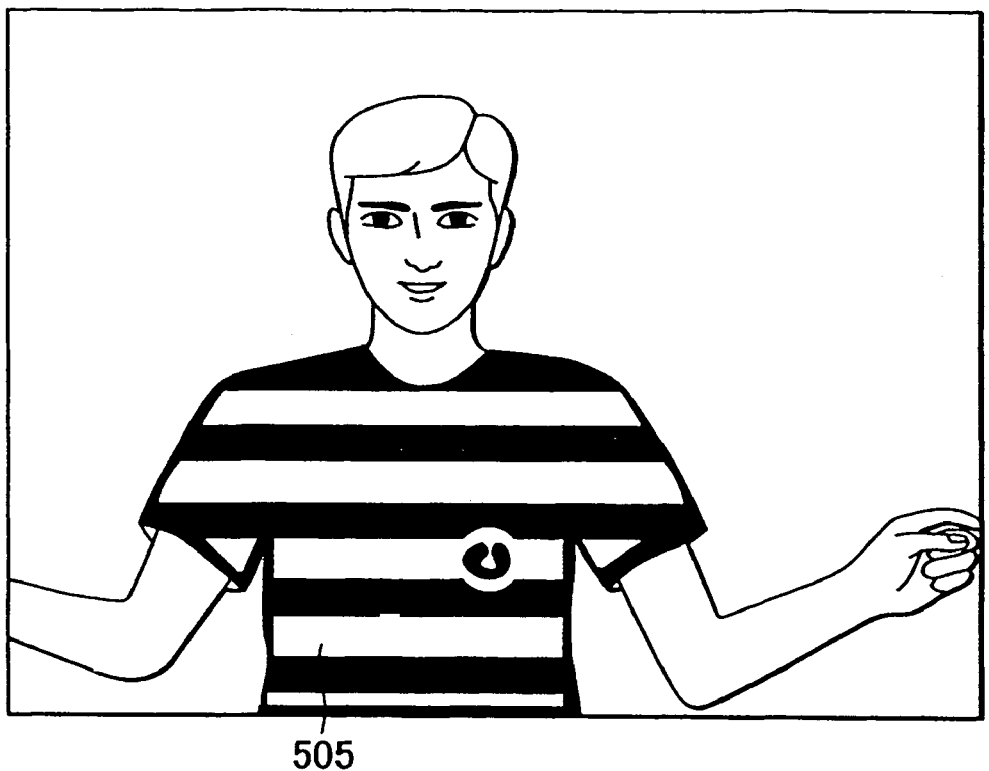
FIG. 11 is a third figure showing a further form to superpose an image signal of selling goods in the service business enterprise system shown in FIG. 1.
Figure 12:
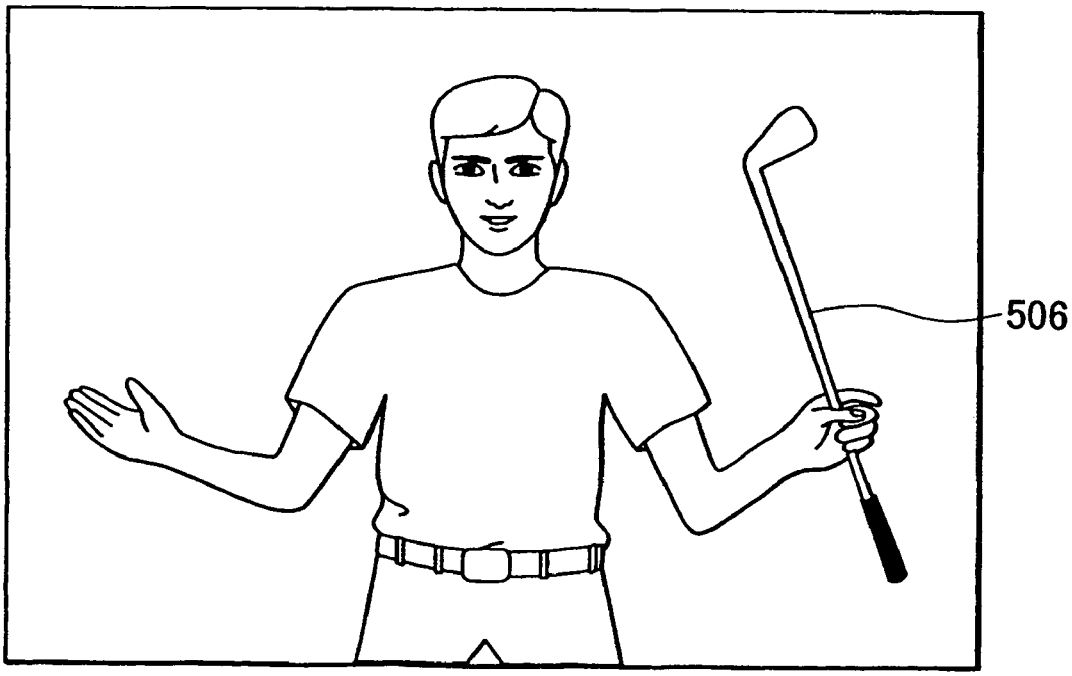
FIG. 12 is a fourth figure showing a further form to superpose an image signal of selling goods in the service business enterprise system shown in FIG. 1.

For example, there may be produced an image in which the outerwear of the user is replaced by clothes 505 of an advertisement object as shown in FIG. 11 and an image in which the user has selling goods 506 by hand as shown in FIG. 12.

According to such a way, such image with more reality can be generated.

Figure 13:
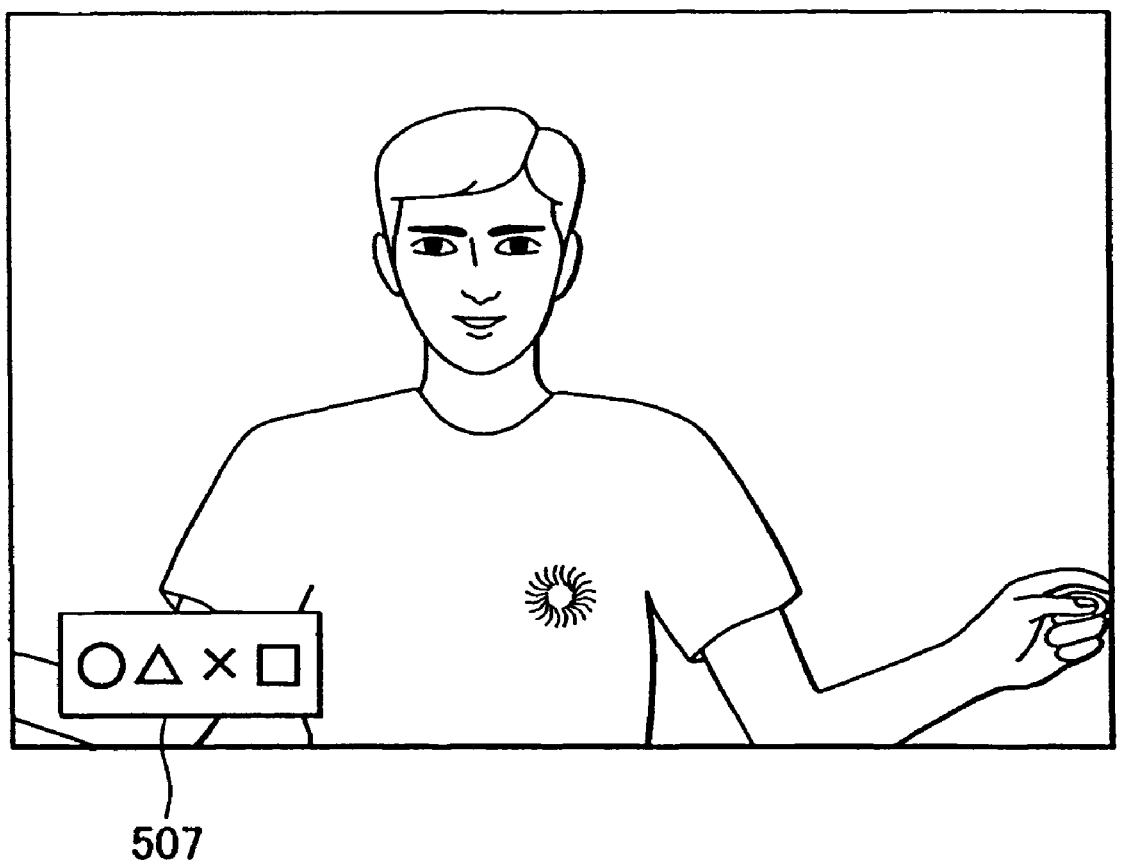
FIG. 13 is a fifth figure showing a further form to superpose an image signal of selling goods in the service business enterprise system shown in FIG. 1.

Moreover, as shown in FIG. 13, the advertisement and propaganda of selling goods may be performed in a way in which an object 507 having the name of the selling goods or the image signal of the selling goods is simply superimposed on a live image signal regardless of the live image.

Such a method has modest persuasive power, but the structure of an image processing circuit can be simplified very much.

Moreover, although it is not shown in the aforesaid embodiment, in the case where the user B who is talking with the user A over the telephone took an interest in advertised selling goods and begin to communicate with the sponsor system 400 concerning the selling goods, the further information of the selling goods transmitted from the sponsor system 400 is simultaneously displayed on the display section 108 of the user terminal apparatus 100-B on which a live image of the user A is being displayed.

The forms of the display in this case include the cases shown in FIGS. 14A-14D, for example, and may be arbitrary forms.

Figure 14A:
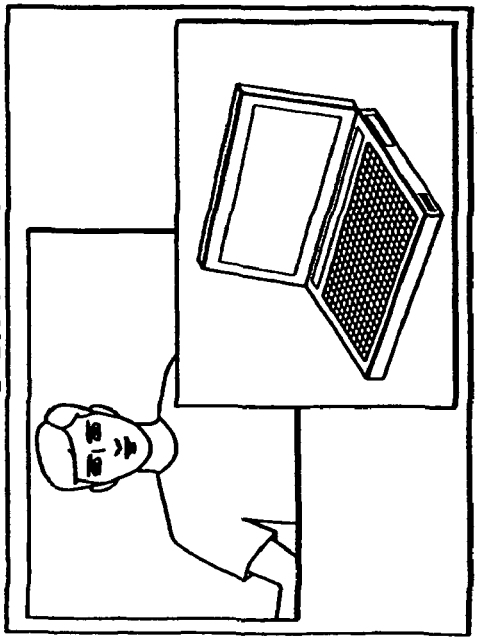
FIGS. 14A-14D are figures showing the displayed states of introduction screens of selling goods on the display of the user terminal apparatus shown in FIG. 2.
Figure 14B:
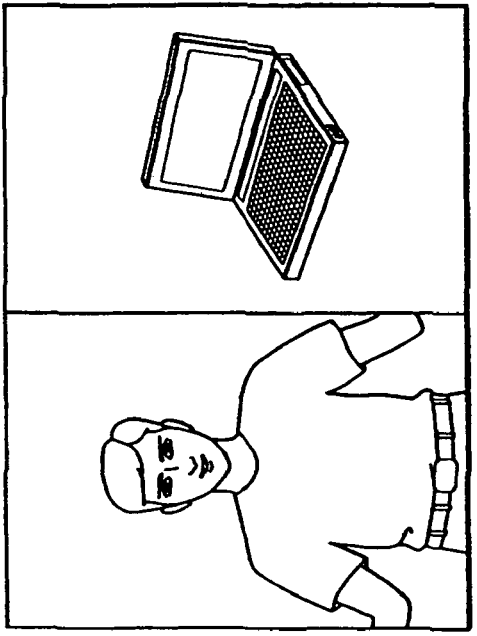
Figure 14C:
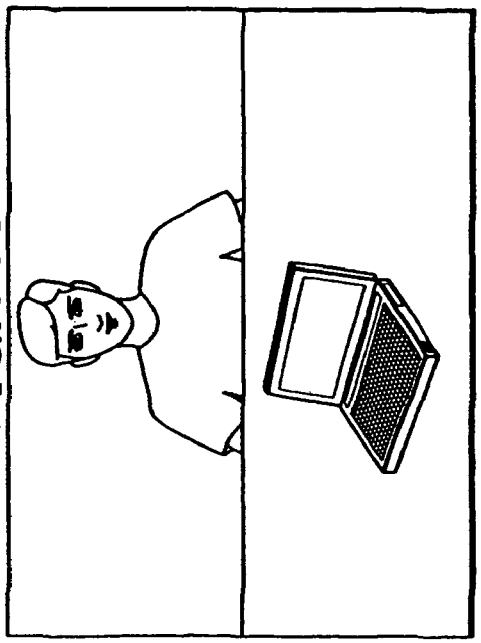

For example, as shown in FIG. 14A, a window in which the five image of the user A is displayed and a window in which an introduction image of selling goods is displayed may be displayed in a way that both of the windows are displayed with a shift while being overlapped partially, or both the windows may be displayed separately in the vertical direction as shown in FIG. 14B, or both may be displayed separately in the horizontal direction as shown in FIG. 14C.

Figure 14D:
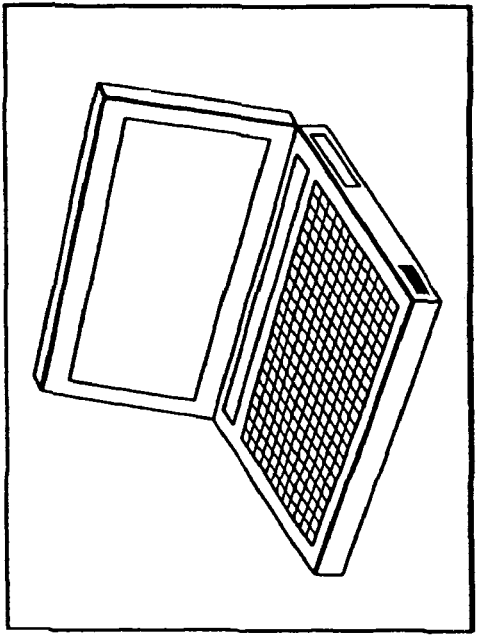

Moreover, while the information of selling goods is transmitted from the sponsor system 400, even if the user B is talking with the user A over the telephone, only the introduction image of the selling goods may be displayed on the whole screen of the display without the display of the live image of the user A as shown in FIG. 14D.

Moreover, although the case where the information of selling goods is obtained from the sponsor system 400 while the user B keeps the conversation with the user A is described in the aforesaid embodiment, the information concerning the advertisement object as selling goods that are received during the telephone call with the user A is stored in the memory 120 of the user terminal apparatus 100 until the next telephone call begins. Therefore, the information stored in the memory 120 may be read out after the end of the telephone call with the user A, and the desired information may be obtained by the separate connection with the sponsor system 400.

Moreover, in the present embodiment, the information of an advertisement object as selling goods is superposed only with image data, and audio data are transmitted between users without any processing. However, in the present invention, the advertisement information may be added to audio data.

To put it concretely, for example, as the voices in the background while telephone calling is being performed, music or voices making the user remember the selling goods or the company that manufactures and sells the advertised object.

Moreover, the audio data concerning an advertisement object as selling goods may be sounded when voiceless time has continued longer than a predetermined period, namely silence continues longer than the predetermined period.

Figure 15:
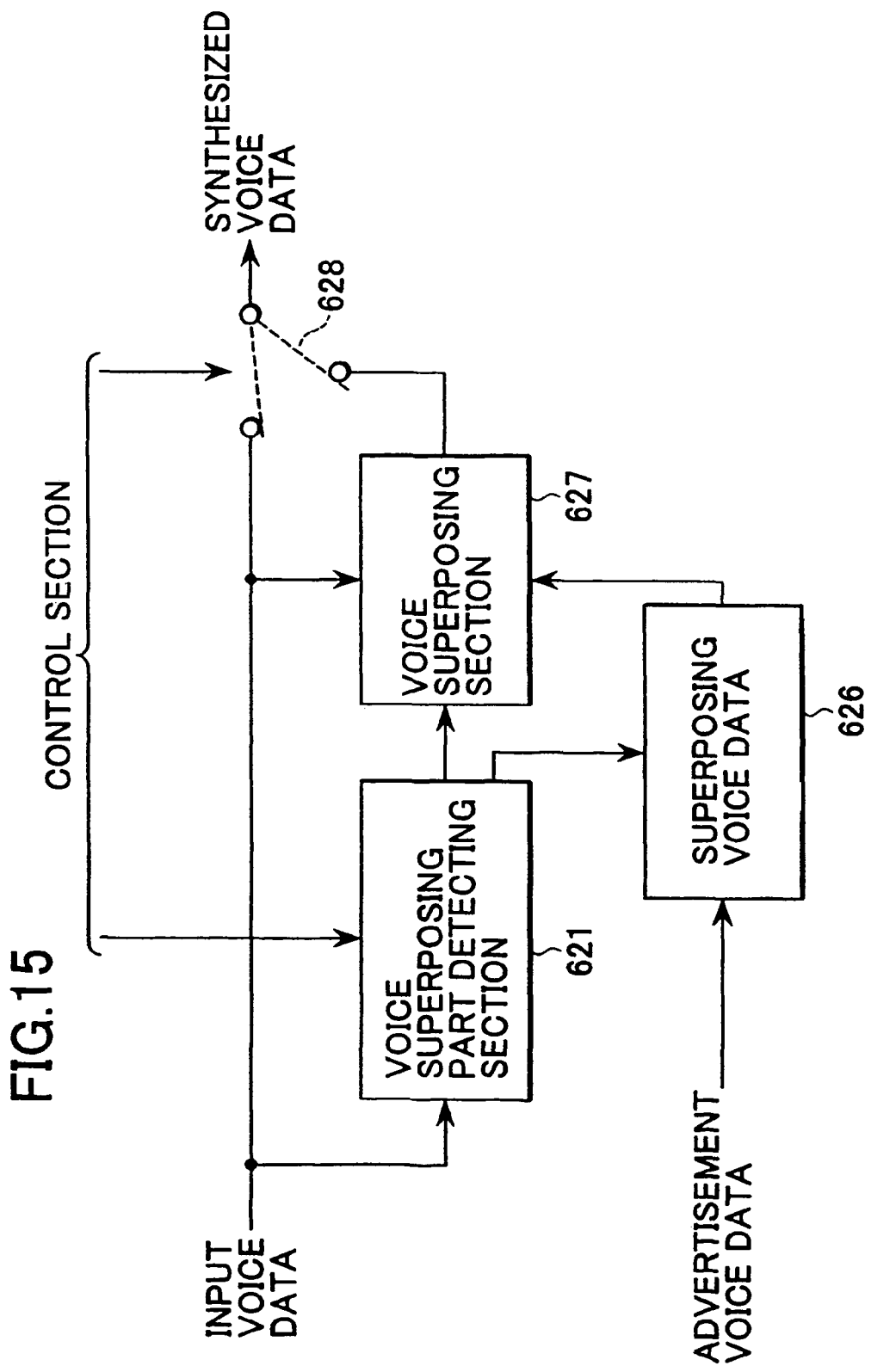
FIG. 15 is a block diagram showing the configuration of the part for processing the addition of advertisement data to audio data in the advertisement information adding section of the service business enterprise system shown in FIG. 3.

The constitution of a processing section for the superposing of voices that is provided in the advertisement information adding section 320 for the aforesaid cases is shown in FIG. 15.

In the configuration shown in FIG. 15, a voice superposing part detecting section 621 detects parts at which voices are superposed, and a preprocessing section 626 converts, for example, the levels, the periods and the like of the audio data to be superposed into forms suitable to the superposition. Furthermore, an image superposing section 627 performs the superposing, and a switching section 628 selects the data to be output.

Moreover, although in the aforesaid service business enterprise system 300 the advertisement object commodities are selected to be used in conformity with the priority set by each user, they may be selected according to telephone calling companions to be objects of advertisement propaganda.

For example, each user may select selling goods by reference to the previously registered information concerning the decision of selling goods when the user receives advertisements.

Figure 16:
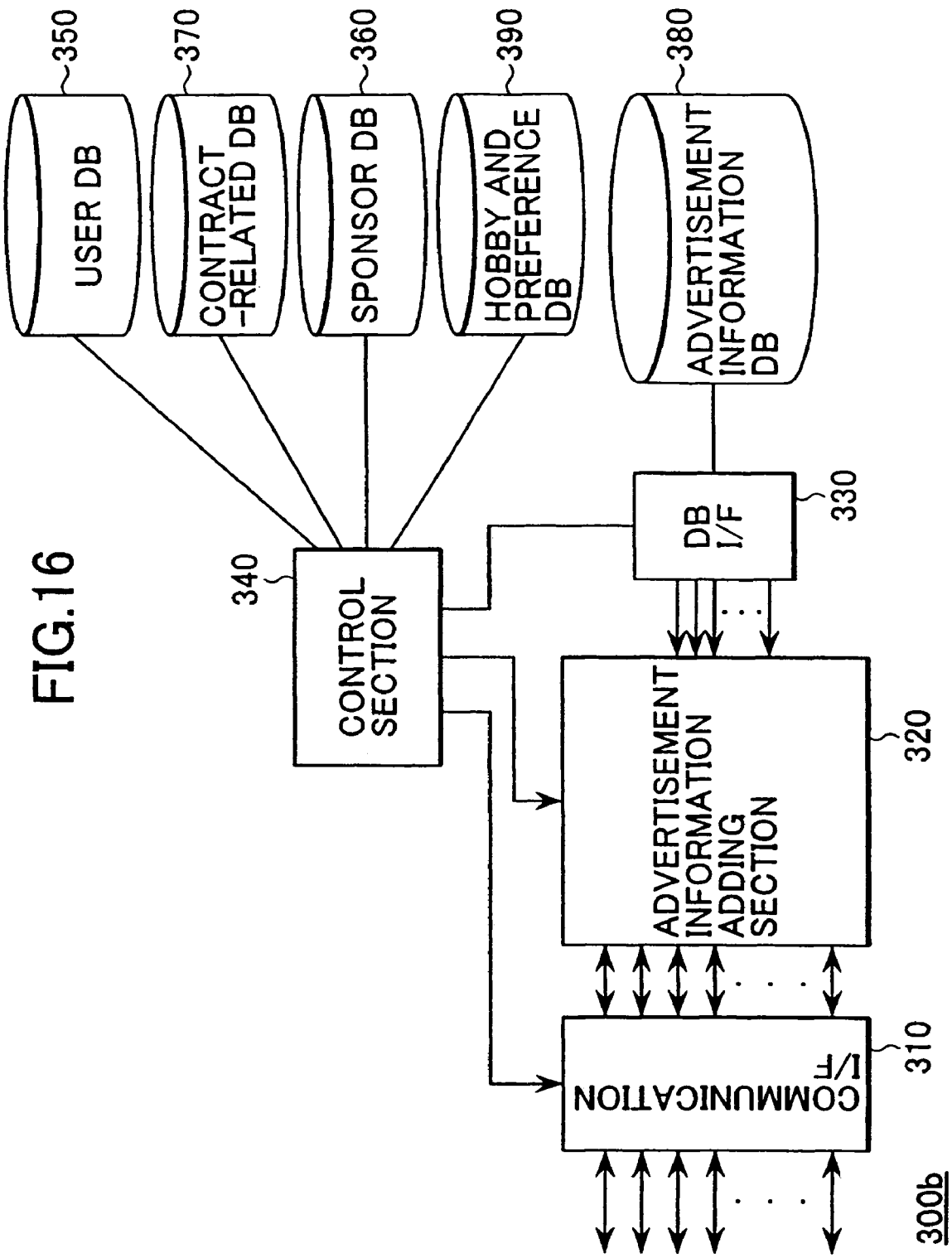
FIG. 16 is a block diagram showing an example of another configuration of the service business enterprise system shown in FIG. 3.

Moreover, as shown in FIG. 16, a hobby and preference database 390 in which the hobby and the preference of each user are registered is beforehand provided in a service business enterprise system 300b, and then selling goods that seem to be effective at the time of being advertised to an user may be selected on the basis of the data stored in the hobby and preference database 390. In this case, the data to be registered in the hobby and preference database 390 may be collected on the basis of the declaration from each user, and they may be automatically collected by the extraction using key words from the contents of conversations of the users, or the like.

Moreover, the constitutions of the connection system 200 and the service business enterprise system 300 in the communication system 11 are also not limited to those of the present embodiment.

Figure 17:
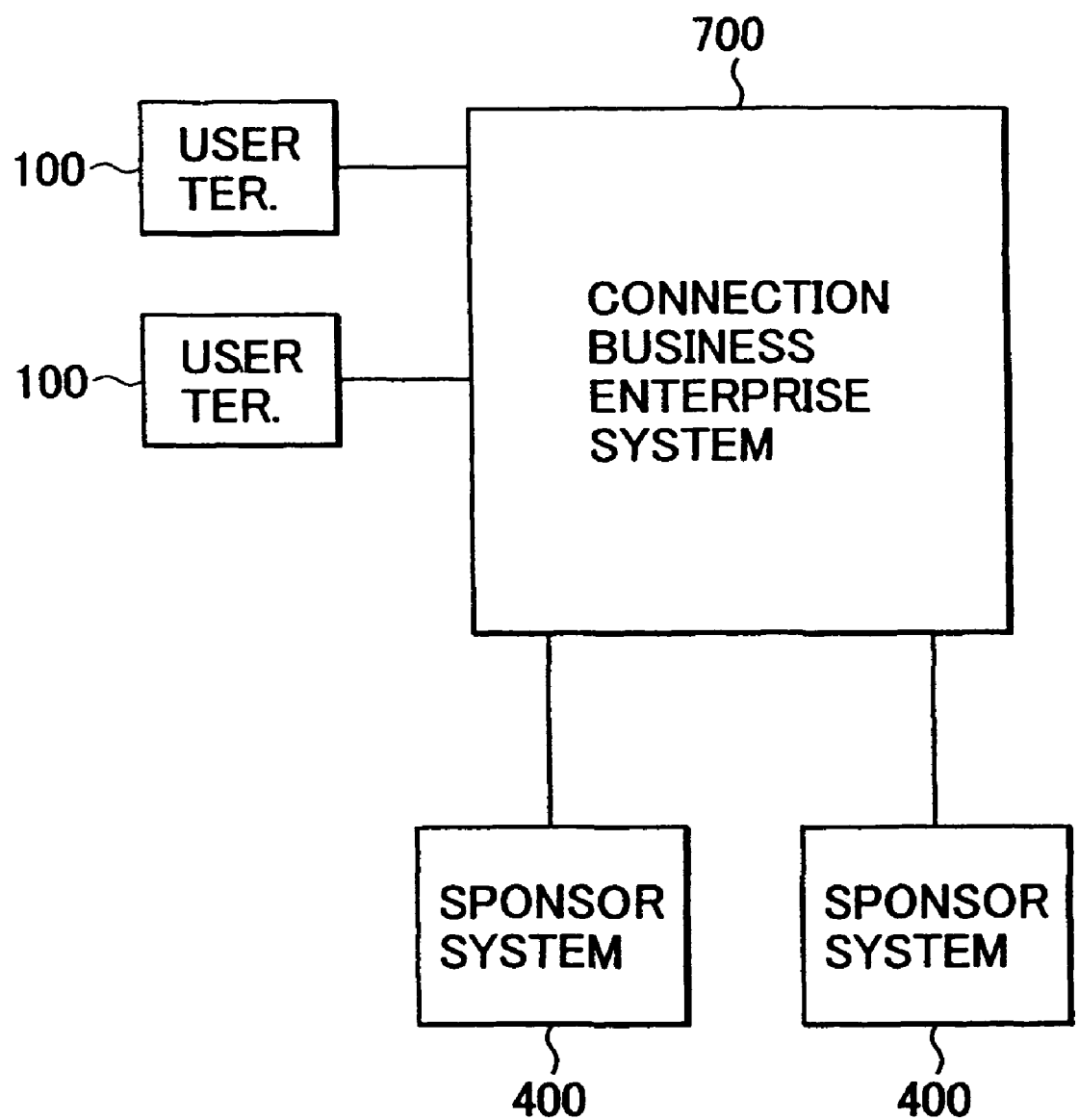
FIG. 17 is a block diagram showing an example of another configuration of the communication system shown in FIG. 1.

For example, as shown in FIG. 17, the configuration of the communication system may be a form in which a connection business enterprise also supplies services as a service business enterprise, namely it may be the communication system 12 in which the connection system 200 and the service business enterprise system 300 are integrated to form a connection business enterprise system 700.

Moreover, although the aforesaid embodiment includes a basic configuration in which one connection system 200 and one service business enterprise system 300 respectively provided, a configuration in which a plurality of connection systems 200 and a plurality of service business enterprise systems 300 are provided may be applicable.

Moreover, although the superposing of a live image and an advertisement image is simply performed by replacing a prescribed area of the live image signal with the advertisement image signal in the aforesaid embodiment, the superposing is not limited to such processing. For example, the superposing may be performed by processing the blend of input image data and advertisement image data at a prescribed ratio. In the case where such a superposing is performed, an image like a perspective of an input image as a background image can be generated, e.g. semitransparent selling goods can be more realistically expressed.

Moreover, the data form when such a live image signal and a superposed image signal are transmitted may be a personal format, or may be the format of a HTML (Hyper Text Markup Language) or the i-MODE. Moreover, it may be an arbitrary opened format to be connectable to the Internet.

Moreover, the superposing of a live image signal and selling goods image may be performed by the user terminal apparatus 100 on the side of transmission or the user terminal apparatus 100 on the side of reception.

Moreover, on the occasion of the switchover to the mode of the electronic transaction in which the information of selling goods actually accessed from the advertisement, the access is not performed directly to the sponsor system 400 from the user terminal apparatus 100, but the service business enterprise system 300 may make the user terminal apparatus 100 and the sponsor system 400 connect by mediating. In such a form, the control data to be transmitted to the connection system 200 from the service business enterprise system 300 in the advertisement step can be decreased.

Moreover, an object of advertisement and propaganda may be an arbitrary one such as selling goods, a corporation and a brand.

Moreover, as for the timing at which an advertisement is changed, the advertisement of one object may be changed at every telephone call, or may be changed at every passage of a prescribed time. Furthermore, the advertisement may be changed in conformity with the operation of an user who transmits communication or an user who receives the communication.

Moreover, an arbitrary standard may be set as the payment standard of a consideration that each user becomes an advertising medium. For example, the number of times of the appearance of an advertisement, the period of time of the appearance of the advertisement, the selection number of times by an user on the side of reception, and every sales of the selling goods may be the standard.

Moreover, as to the payment method of the consideration in the case, too, an arbitrary method may be adopted. For example, the payment in cash, returning as a utility rate of the communication service, returning at the time of performing electronic transactions and the like may be applicable.

Moreover, although the communication between two users is illustrated in the present embodiment, in case of communication among numerous users of equal to or more than three, too, it is possible to apply the present embodiment just as it is.

Besides, the way of the connecting of a connection business enterprise, the kind of the communication network, the transmission form of data, the form of the user terminal apparatus and so on, too, may be an arbitrary way, an arbitrary kind, arbitrary forms, respectively, and they are not limited to the present embodiment at all.

Moreover, in the present embodiment, the information of selling goods which are once memorized in the memory 120 of the user terminal apparatus 100 is supposed to be erased at every time when the next communication is begun by the user terminal apparatus 100. However, the information may be accumulated in sequence, and may be made to be able to be referred as the occasion demands by the tracing back to the past. The information of selling goods may be utilized in an arbitrary form after reception.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A communication system comprising:
    a first communication terminal apparatus utilized by a first user and connected to a second communication terminal apparatus utilized by a second user through a communication service apparatus,
    wherein the first and second communication terminal apparatuses are adapted to perform mutual telephone calling, each of said communication terminal apparatuses comprising:
        telephone calling means for performing telephone calling between said first communication terminal and said second communication terminal apparatus;
        image data superposing means for superposing first image data received from one of said communication terminal apparatuses in real time with second image data, the second image data concerning one or more products, to generate third image data, said second image data being provided by a sponsor system;
        position designating means for designating a position for said second image data on said first image data;
        receiving means for receiving said third image data and predetermined control data, said third image data and said control data being transmitted from the communication service apparatus;
        displaying means for displaying said third image data; and
        controlling means for performing predetermined processing based on a request received from one of said communication terminal apparatuses,
    wherein the one or more products in the second image data are selected by the first user to sell the one or more products to the second user, and the position designating means designates the position for the second image data on the first image data so that the third image data indicates that the one or more products are being used by the first user.

2. The communication system according to claim 1, wherein
    said controlling means requests additional information related to said one or more products when said request is received.

3. The communication system according to claim 2, wherein
    a portion of said displaying means displays an environment for performing transactions of said one or more products.

4. The communication system according to claim 2, wherein
    said receiving means receives information related to said one or more products from said communication service apparatus; and
    said displaying means displays said information related to said one or more products.

5. The communication system according to claim 4, wherein, said communication terminal apparatuses simultaneously receive information from said communication service apparatus.

6. The communication system according to claim 1, wherein
said controlling means requests an environment for performing transactions of said one or more products from said communication service apparatus when said request is received.

7. A communication system including a plurality of communication terminal apparatuses utilized by at least a first and a second user and a communication service apparatus for connecting said plurality of communication terminal apparatuses in order to transmit audio data and image data, wherein said communication service apparatus comprises:
receiving means for receiving first image data from one of said plurality of communication terminal apparatuses in real time;
image data superposing means for superposing said first image data with second image data related to one or more products to generate third image data, said second image being provided by a sponsor system; and
position designating means for designating a position for said second image data on said first image data;
transmitting means for transmitting said third image data to another of said plurality of communication terminal apparatuses; and wherein
each of said communication terminal apparatuses comprises:
receiving means for receiving said third image data; and
displaying means for displaying said third image data,
wherein the one or more products in the second image data are selected by the first user to sell the one or more products to the second user, and the position designating means designates the position for the second image data on the first image data so that the third image data indicates that the one or more products are being used by the first user.

8. An advertisement method used in a communication environment in which a plurality of communication terminal apparatuses utilized by at least a first user and a second user are connected via a communication service apparatus through which audio data and image data can be transmitted, said advertisement method comprising the steps of:
selecting one or more products as a desired advertisement object by said communication service apparatus;
superposing first image data received from one of said plurality of communication terminal apparatuses in real time with second image data relating to selected one or more products to generate third image data, said second image data being provided by a sponsor system;
designating a position for said second image data on said first image data;
delivering said third image data to another of said plurality of communication terminal apparatuses, wherein each of said communication terminal apparatuses comprises:
receiving means for receiving said third image data; and
displaying means for displaying said third image data,
wherein the one or more products in the second image data are selected by the first user to sell the one or more products to the second user, and the position designating means designates the position for the second image data on the first image data so that the third image data indicates that the one or more products are being used by the first user.

9. The advertisement method according to claim 8, wherein
said first image data received from said one of said plurality of communication terminal apparatuses includes an image of a user of said one of said plurality of communication terminal apparatuses.

10. The advertisement method according to claim 9, wherein:
said third image data includes an image in which said user of said one of said plurality of communication terminal apparatuses is superposed on said one or more products.

11. The advertisement method according to claim 9, wherein:
said third image data includes an image in which said user of said one of said plurality of communication terminal apparatuses uses said one or more products.

12. The advertisement method according to claim 9, wherein:
said third image data includes an image in which said user of said one of said plurality of communication terminal apparatuses holds said one or more products.

13. The advertisement method according to claim 8, wherein:
additional information of said one or more products is supplied to said one of said plurality of communication terminal apparatuses to which said third image data is delivered in response to a demand from said one of said plurality of communication terminal apparatuses.

14. The advertisement method according to claim 8, wherein:
consideration is paid to said user of said one of said plurality of communication terminal apparatuses to which said third image data is delivered, and based on a predetermined condition concerning the delivery of said third image data of the one or more products.

15. The advertisement method according to claim 8, wherein:
said third image data including an image of said one or more products is selectively delivered to said one of said plurality of communication terminal apparatuses depending on said first and second user thereof.

16. The advertisement method according to claim 8, wherein:
a transaction environment of said one or more products is supplied to said one of said plurality of communication terminal apparatuses to which said third image data is delivered in response to a demand from said one of said plurality of communication terminal apparatuses.

* * * * *